United States Patent
Biswas et al.

(10) Patent No.: US 11,734,148 B2
(45) Date of Patent: *Aug. 22, 2023

(54) TESTING CLOUD APPLICATION INTEGRATIONS, DATA, AND PROTOCOLS

(71) Applicant: Oracle International Corporation, Redwood Shores, CA (US)

(72) Inventors: Kamalendu Biswas, San Ramon, CA (US); Gaurav Bhatia, New Delhi (IN); Shachi Prasad, Sunnyvale, CA (US); Kiran Shriniwas Doddi, Pune (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,336

(22) Filed: Apr. 18, 2022

(65) Prior Publication Data

US 2022/0253534 A1 Aug. 11, 2022

Related U.S. Application Data

(63) Continuation of application No. 16/927,298, filed on Jul. 13, 2020, now Pat. No. 11,308,221, which is a (Continued)

(30) Foreign Application Priority Data

Sep. 28, 2017 (IN) .............................. 201741034596

(51) Int. Cl.
*G06F 11/34* (2006.01)
*G06F 21/57* (2013.01)
*G06F 21/55* (2013.01)

(52) U.S. Cl.
CPC ........ *G06F 11/3457* (2013.01); *G06F 21/552* (2013.01); *G06F 21/577* (2013.01); *G06F 2201/86* (2013.01)

(58) Field of Classification Search
CPC .. G06F 11/3457; G06F 21/552; G06F 21/577; G06F 2201/86; G06F 2221/034
See application file for complete search history.

(56) References Cited

U.S. PATENT DOCUMENTS 8,756,698 B2 6/2014 Sidagni
9,473,522 B1* 10/2016 Kotler ................. H04L 63/1433
(Continued)

OTHER PUBLICATIONS

U.S. Appl. No. 16/147,157, Notice of Allowance dated Mar. 5, 2020, 18 pages.
(Continued)

*Primary Examiner* — Joseph R Kudirka
(74) *Attorney, Agent, or Firm* — Kilpatrick Townsend & Stockton LLP

(57) ABSTRACT

Provided are systems, methods, and computer-readable medium for a simulation platform that can generate simulated activity data for testing a security monitoring and control system. In various examples, the simulation platform can parse the activity data from a cloud service to generate a template, where each entry in the template describes an action and the fields associated with the action. The simulation platform can further generate a configuration that describes a test scenario. The simulation platform can use the configuration and the template to generate the particular action, including randomizing some or all of the fields of the action. When input into the security monitoring and control system, the system can operate on the simulated activity data in the same way as when the system ingests live activity data.

19 Claims, 12 Drawing Sheets

Related U.S. Application Data continuation of application No. 16/147,157, filed on Sep. 28, 2018, now Pat. No. 10,713,365.

(56) References Cited

U.S. PATENT DOCUMENTS

| | | |
|---|---|---|
| 9,692,789 B2 | 6/2017 | Kirti et al. |
| 10,063,654 B2 | 8/2018 | Kirti et al. |
| 10,318,742 B1 | 6/2019 | Sankruthi |
| 10,713,365 B2 | 7/2020 | Biswas et al. |
| 2016/0232353 A1 | 8/2016 | Gupta et al. |
| 2017/0180399 A1 | 6/2017 | Sukhomlinov et al. |
| 2017/0251013 A1 | 8/2017 | Kirti et al. |
| 2017/0295199 A1 | 10/2017 | Kirti et al. |
| 2018/0025160 A1 | 1/2018 | Hwang et al. |
| 2018/0239902 A1* | 8/2018 | Godard ............... G06F 21/53 |
| 2018/0288087 A1* | 10/2018 | Hittel ............... G06F 21/577 |
| 2019/0318100 A1 | 10/2019 | Bhatia et al. |

OTHER PUBLICATIONS

U.S. Appl. No. 16/927,298, Non-Final Office Action dated Aug. 18, 2021, 10 pages.

U.S. Appl. No. 16/927,298, Notice of Allowance dated Dec. 9, 2021, 8 pages.

\* cited by examiner

800

Obtaining activity data from a service provider system, wherein the activity data includes a list of actions performed during use of a cloud service, wherein actions in the list of actions are performed by one or more users associated with a tenant, wherein the service provider system provides the tenant with a tenant account, and wherein the tenant account enables the one or more users to use the cloud service.
802

↓

Parsing an action from the list of actions to determine a list of fields included in the action
804

↓

Identifying a field from the list a fields, wherein an identity of the field describes data included in the field
806

↓

Generating a template for the action, the template include a data structure storing the identity of the field, wherein the template further includes a data structure describing a format of the action
808

↓

Generating a configuration associated with a test scenario, the configuration including a reference to the template and description of an action associated with the test scenario
810

↓

Generating a simulated action for the action described in the configuration, wherein generating the simulated action includes using the template to determine fields for the action and an output structure for the action, and wherein generating the simulated action includes using a test description to select values for the fields
812

```
                    800

┌─────┐
                  │ FIG.│
                  │ 8A  │
                  └──┬──┘
                     ▼
┌─────────────────────────────────────────────────────────────────────┐
│ Generating simulated activity data that includes the simulated       │
│ action, wherein the simulated activity data has a same format as     │
│ the activity data                                                    │
│                            814                                       │
└─────────────────────────────┬───────────────────────────────────────┘
                              ▼
┌─────────────────────────────────────────────────────────────────────┐
│ Inputting the simulated activity data into the security management  │
│ system, wherein the security management system operates on the      │
│ simulated activity data to determine whether actions included in    │
│ the simulated activity data include use of the cloud service that   │
│ constitutes a security risk, and wherein the simulated action       │
│ causes security management system to perform a particular           │
│ operation, wherein the particular operation is associated with the  │
│ test scenario                                                       │
│                            816                                       │
└─────────────────────────────────────────────────────────────────────┘
```

FIG. 8B

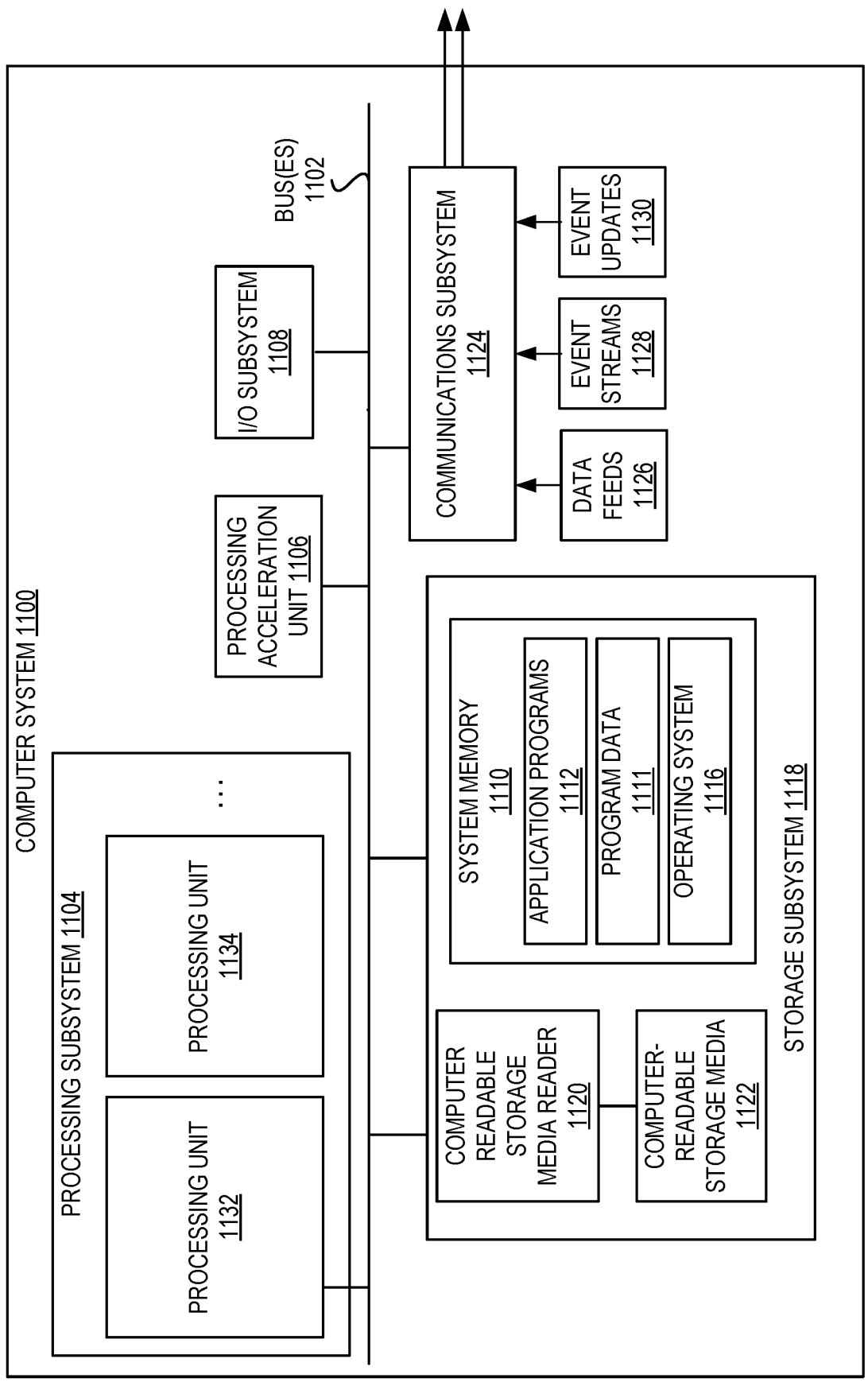

TESTING CLOUD APPLICATION INTEGRATIONS, DATA, AND PROTOCOLS

CROSS REFERENCE TO RELATED APPLICATIONS

This application is a continuation of U.S. patent application Ser. No. 16/927,298 entitled "Testing Cloud Application Integrations, Data, And Protocols", filed on Jul. 13, 2020, which is hereby incorporated by reference in its entirety for all purposes.

U.S. patent application Ser. No. 16/927,298 is a continuation of U.S. patent application Ser. No. 16/147,157 entitled "Testing Cloud Application Integrations, Data, And Protocols", filed on Sep. 28, 2018, which is hereby incorporated by reference in its entirety for all purposes.

U.S. patent application Ser. No. 16/147,157 claims priority to and the benefit of Indian Provisional Application No. 201741034596, filed on Sep. 28, 2017, which is hereby incorporated herein by reference in its entirety.

BACKGROUND

Cloud service providers provide various services in the "cloud;" that is, over a network, such as the public Internet, and remotely accessible to any network-connected client device. Examples of the service models used by cloud service providers (also referred to herein as "cloud providers" or "providers") include infrastructure as a service (IaaS), platform as a service (PaaS), software as a service (SaaS), and network as a service (NaaS). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to customer on a subscription basis, and is centrally hosted by the cloud provider. Under this model, applications can be accessed, for example, using a web browser. NaaS providers provide network services to customers, for example by provisioning a virtual network on the network infrastructure operated by another party. In each of these service models, the cloud service provider maintains and manages the hardware and/or software that provide the services, and little, if any, software executes on a user's device.

Customers of cloud service providers, which can be referred to as users or tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users. Examples of service providers include Box, Dropbox, Microsoft, Docusign, Google, Salesforce, Oracle, Amazon, and others. Service provider such as these can provide multiple different services, but different service providers need not have any affiliation with one another, including not sharing infrastructure or security boundaries. Service provider systems are often also heavily secured and closed to non-tenants.

The reliance of organizations on computing environments has led to widespread adoption of cloud services for operations such as collaboration, sales and customer services, infrastructures, and so on. Applications provided through a cloud environment may enable organizations to rollout services faster and without much upfront investment on data center, hardware, software, and deployment projects. The accessibility of applications can increase employee productivity due to the availability of cloud enabled services from many locations, such as at work, at home, at a hotel, and other locations.

Because organizations and/or users of an organization may subscribe to the services of many different cloud services providers, an organization may need ways to ensure the organization's own systems do not come to harm through the use of cloud services. Use of cloud services can lead to security risks that are not present when an organization hosts and manages services within the organization itself.

BRIEF SUMMARY

In various implementations, provided are systems and methods for a simulation engine for testing a security management system. The simulation engine enables testing of the security management system without needing to be connected to a service provider. Additionally, the simulation engine can produce large volumes of pseudo-random data, and thus provide far more comprehensive testing that may be possible with only live data.

Examples discussed herein include methods that can be implemented at a computer system of a security management system, computing systems of a security management system, and non-transitory computer readable medium that stores instructions that can be executed by a computing system of a security management system. In various examples, techniques disclosed herein include obtaining activity data from a service provider system, wherein the activity data includes a list of actions performed during use of a cloud service, wherein actions in the list of actions are performed by one or more users associated with a tenant, wherein the service provider system provides the tenant with a tenant account, and wherein the tenant account enables the one or more users to use the cloud service. The techniques further include parsing an action from the list of actions to determine a list of fields included in the action. The techniques further include identifying a field from the list a fields, wherein an identity of the field describes data included in the field. The techniques further include generating a template for the action, the template include a data structure storing the identity of the field, wherein the template further includes a data structure describing a format of the action. The techniques further include generating a configuration associated with a test scenario, the configuration including a reference to the template and description of an action associated with the test scenario. The techniques further include generating a simulated action for the action described in the configuration, wherein generating the simulated action includes using the template to determine fields for the action and an output structure for the action, and wherein generating the simulated action includes using a test description to select values for the fields. The techniques further include generating simulated activity data that includes the simulated action, wherein the simulated activity data has a same format as the activity data. The techniques further include inputting the simulated activity data into the security management system, wherein the security management system operates on the simulated activity data to determine whether actions included in the simulated activity data include use of the cloud service that constitutes a security risk, and wherein the simulated action causes security management system to perform a particular operation, wherein the particular operation is associated with the test scenario.

In some aspects, identifying the field includes matching contents of the field against a pattern from a plurality of patterns. In some aspects, identifying the field includes inputting contents of the field into a machine learning model, wherein the machine learning model associates fields having different formats with a same identity.

In some aspects, the techniques described above further include generating additional simulated actions, each additional simulated action having fields determined using the template and different randomized values for the fields, wherein the simulated activity data includes the additional simulated actions.

In some aspects, the template is associated with the cloud service. In these aspects, the techniques further include generating a different template for a different cloud service. The techniques further include generating different activity data using the different template and the configuration.

In some aspects, the techniques discussed above further include generating a second configuration associated with a second test scenario. In these aspects, the techniques further include generating different activity data using the second configuration and the template.

In some aspects, the techniques discussed above further include inputting the activity data into the security management system concurrent with the simulated activity data.

In some aspects, the test scenario is a violation of a security policy, and wherein the security management system determines that the simulated action violates the security policy. In some aspects, the test scenario is anomaly detection, and wherein the security management system determines that the simulated action is anomalous.

The foregoing, together with other features and implementations will become more apparent upon referring to the following specification, claims, and accompanying drawings.

BRIEF DESCRIPTION OF THE DRAWINGS

FIGS. 8A-8B include a flowchart that illustrates an example of a process for testing a security monitoring and control system.

FIG. 11 illustrates an example of a computer system that may be used to implement various examples.

DETAILED DESCRIPTION

Figure 1:
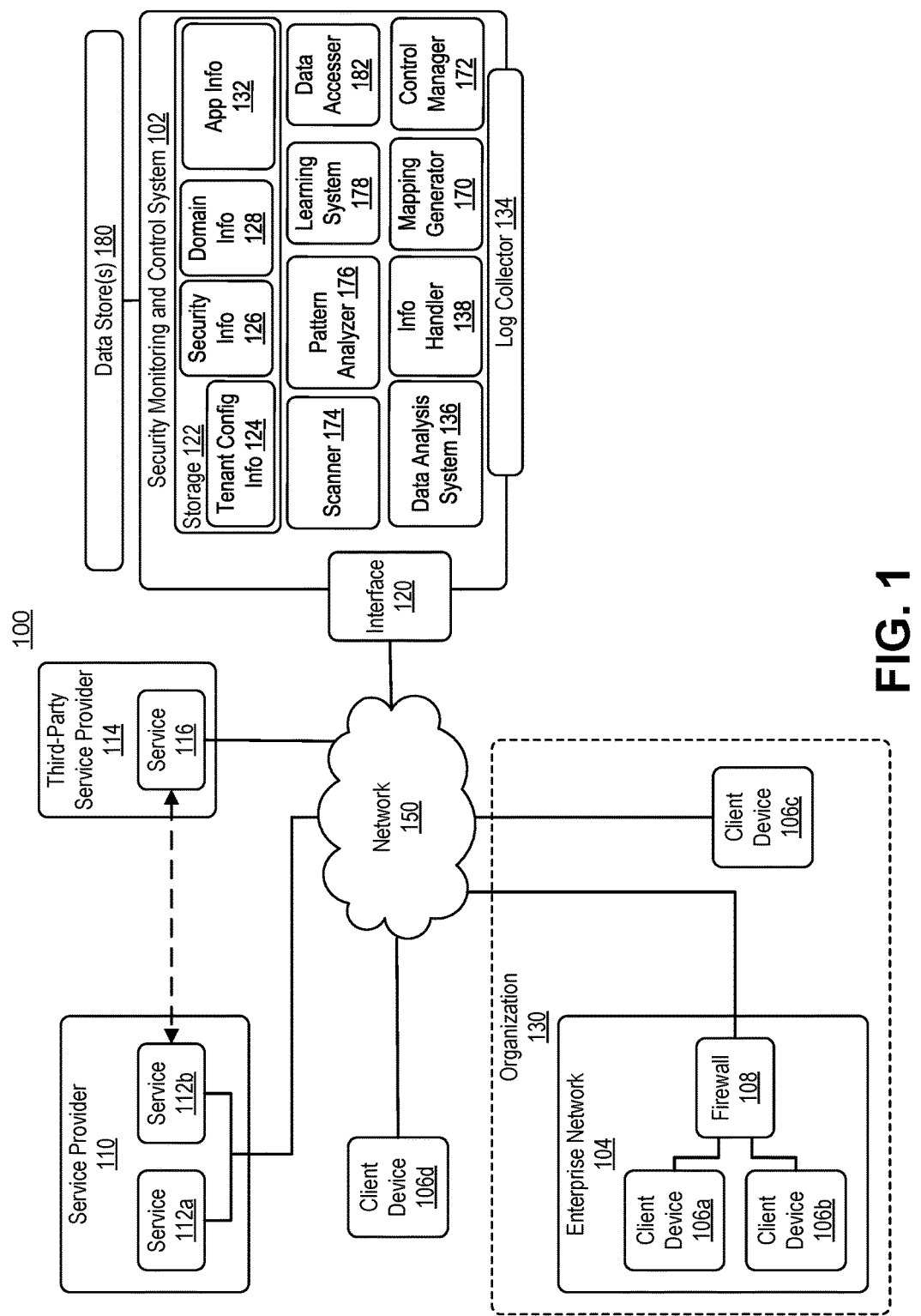
FIG. 1 includes a block diagram illustrating an example of a computing environment that includes a security monitoring and control system.

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

In various examples, security monitoring and control system, also referred to herein as a security management system, can monitor an organization's usage of one cloud service or multiple cloud services, and can identify any security risks that may result from usage of the cloud services. The security monitoring and control system can be a complex system of software and hardware, and thus may need to be tested before the services of the system are made available to customers, and/or at various other times. For example, support for a new cloud service can integrated into the security monitoring and control system, so that the system can include the new cloud service in the services being monitored. In this example, it may be desirable to determine that the security monitoring and control system's various capabilities work with the new cloud service, before the system processes any tenant data from the service. As another example, the operator of the security monitoring and control system may add a new feature to the system, and it may be desirable to test the new feature before the new feature is deployed to customers, to ensure that the new feature does not contain any bugs. As another example, an existing cloud service may have added a new feature or modified an existing feature. In this example, it may be desirable to ensure that the security monitoring and control system's capabilities do not conflict with the new features or modified features, and/or that the changes have been integrated into the system without bugs.

Testing of the security monitoring and control system can take several forms, which aim to test different aspects of the system. For example, unit testing can include testing of individual units or components of the system. Testing units in isolation can ensure that the unit operates correctly, and/or that errors in one unit are not masking errors in a different unit, for example. As another example, functional testing can test specific functions or operations of the system, to ensure that each function performs as designed. As another example, performance testing can test how well the system performs when operating on large amounts of data, or with many simultaneous connections to cloud providers, or when many users are active, or with another type of heavy load. A performance test can show, for example, that the system slows down too much when operating on data from more than a certain number of cloud providers, and may need to be made more efficient for this situation.

Testing of the security monitoring and control system can be accomplished using activity data from a cloud service, which may be referred to herein as "live" data, or the actual data from a cloud service. Using live activity data, however, can impose unwanted limitations on the ability to test the security monitoring and control system. For example, generating live activity data relies on users using the service so that activity occurs and is recorded. For sufficient data to be recording to be useful for testing purposes can thus take a long time. As another example, ordinary usage of a cloud service may not result in activity data that includes the scenarios that need to be tested. For example, the operator of security monitoring and control system may need to test that the system can detect a particular security violation, and if only acceptable usage of the cloud service occurs, the conditions for triggering the security violation may not occur.

One solution for both generating sufficient activity data for testing purposes and for causing test scenarios to occur is for the personnel tasked with testing the security monitoring and control system to use a cloud service, and perform actions that are directed towards the test scenario. For example, when the test scenario is checking whether the system can detect multiple invalid password attempts the testing personnel an repeatedly attempt to log in with incorrect passwords. In this and other examples, the testing person's actions can be recorded in the activity data from the cloud service.

Manually generating test data in this fashion can have limitations, however. For example, to use the cloud service, the testing personnel would need an account with the cloud service, and providing each testing person with an account may be too costly, in monetary terms, thus multiple testing persons may need to use the same account. Actions of different users in the same account, however, can be conflicting or at cross purposes, so that one or another of the testing personnel may not be able to perform the actions for a particular test scenario. As another example, effective testing of the security monitoring and control system may require large amounts of data (e.g., an activity log that includes tens of thousands or hundreds of thousands of actions performed by tens or hundreds of different users). For example, corner case testing and performance testing may require large volumes of data to generate the test scenario. Having testing personnel manually perform actions may thus not be a feasible method for generating test data for these test scenarios.

In various implementations, provided are systems and methods for a simulation platform that can generate simulated activity data for testing a security monitoring and control system. In various examples, the simulation platform can parse the actual activity data from a cloud service to determine the fields associated with each action in the activity data, where each field includes a key and a value. The simulation platform can then generate a template, where each entry in the template describes an action and the fields associated with the action. The template can also include values that each field can have. In this way, the template generalizes the data in an activity log.

The simulation platform can further generate a configuration that describes a test scenario. The test scenario can require that an activity log from a service have certain actions, thus the test scenario can identify a particular action that, if found in the activity data, will conform to the test scenario. The simulation platform can use the configuration and the template to generate the particular action, including randomizing some or all of the fields of the action. In various examples, the simulation platform can thus generate an activity log with many such simulated actions. When input into the security monitoring and control system, the system can operate on the simulated activity data in the same way as when the system ingests live activity data. The simulated actions, however, can cause the security monitoring and control system to perform particular operations that are associated with the test scenario.

In these and other examples, testing of the security monitoring and control system can be accomplished by simulating the data that can be generated during use of a cloud service. Additionally, test generation can be accomplished in a partially or fully automated fashion, with either testing personnel deciding up on test scenarios, or the simulation platform determining test scenarios. Large volumes of data and many different tests can be generated in this way, so that the security monitoring and control system can be tested in a more robust and thorough manner.

FIG. 1 includes a block diagram illustrating an example of a computing environment 100 that includes a security monitoring and control system 102 (also referred to herein as "security management system" and "security system"). The security monitoring and control system 102 can provide threat analysis and remediation for an organization 130 that uses services 112a-112b provided by a cloud service provider 110. Because the services 112a-112b are managed externally to the networks of the organization 130, network security systems of the organization 130 may not be able to ensure that use of the services 112a-112b does not create security risks for the organization 130. In various examples, the users of the organization 130 can access and use the services 112a-112b over an network 150 or a combination of networks. The network 150 can include, for example, the public Internet. The organization 130 can similarly access and use the services of the security monitoring and control system 102 over the network 150. In various examples, the security monitoring and control system 102 can also be described as a cloud service, which is administered by a cloud service provider. An example of a security monitoring and control system is Oracle CASB, which is a product and service offered by Oracle Corporation.

A service provider is a collection of hardware and software configured to provide computing services to others. The computing services can include, for example, hardware resources, processing resources, data storage, hardware platforms, software platforms, and/or applications of various levels of complexity, among other computing resources. In some cases, the service provider operates the hardware and software that enables the provider's services. In some cases, the service provider uses the hardware and software of another service provider. For example, a first service provider can be the operator of a data center, who leases software hosting services resources to a second service provider, who then provides an application such as a collaborative word processing application to users of an organization.

In various examples, service providers follow a subscription model, and lease use of a service to others, where the lease can last for a period of time. A subscriber, who is also referred to herein as a tenant, can be given an account with the service provider and/or with a particular service, through which the tenant uses the service. When the tenant is an organization, the tenant can have an account with the service provider (referred to herein as a tenant account or an enterprise account) and the organization's users can have individual user accounts with the service provider and/or the particular service. In some cases, the user accounts are tied to the account of the tenant, and the tenant account can control and manage the user accounts.

In some examples, a service provider can provide a service without direct remuneration from subscribers. For example, a service provider can provide a free email application, and obtain revenue for the service through other avenues, such as advertising. In this and other examples, subscribers can obtain an account with the service provider without a lease and possibly for an indefinite period of time.

In the example of FIG. 1, the service provider 110 is providing two services 112a-112b that are accessible, over a network 150, to customers of the service provider 110. The services 112a-112b can include, for example, infrastructure, platforms, networks, and applications, among other services. In some examples, the two services 112a-112b can be inter-related, such as being able to share data or being accessible through a single sign-on mechanism (e.g., one set of user credentials enables a user to access both services 112a-112b without needing to separately authenticate with each service). In some examples, the services 112a-112b operate entirely independently. For example, the first service 112a can be a banking application and the second service 112b can be a software development platform. In this example, the service provider 110 may be providing the two services 112a-112b as separate and unrelated products.

Customers of the service provider 110 can include individual users and/or organizations, where an organization can include multiple users. An organization is an entity that brings people and resources together to serve a common purpose or purposes. Examples of organizations include companies, universities, utilities, and governmental entities, among others. The people of the organization can be represented in the organization as users. In the context of the computing environment 100, a user is a digital entity that can include a user name, a user identifier, a user account, credentials (e.g., a password, security token, or another form of credential), and/or other data that can be used to access and use the computing systems of the organization. One or more people can be associated with the same user account, or one person can have multiple user accounts. For example, a member of the network administration team can use the same administrative user account that is used by other members of the network administration team, while also having a user account that is used only by the one network administrator. In some examples, activities of a user can be driven by automated programs (such as "bots") instead of or in addition to being driven by a human being.

In various examples, the users of the organization and the resources of the organization are under common administration and can operate within a same security perimeter. For example, in the example of FIG. 1, the resources of the organization 130 include an enterprise network 104 and a number of client devices 106a-106c. The client devices 106a-106c can include, for example, desktop computers, laptop computers, smartphones, tablets, and other computing devices. In some examples, the client devices 106a-106c can be personally owned by employees of the organization 130, but while these devices are connected to the enterprise network 104, the devices are administered by the organization 130. The enterprise network 104 can also include other computing devices, such as servers, printers, routers, switches, and other network devices. Resources of the organization 130 can also include data (e.g. documents, webpages, business data, user data, etc.), databases, applications, processing capacity, storage capacity, networking capacity, and other hardware, software, or digital resources.

In various examples, client devices 106a-106b of the organization 130 can be connected to and operate within the enterprise network 104. For example, the client devices 106a-106b can be connected to a switch within the enterprise network 104, which puts the client devices 106a-106b behind the firewall 108 of the enterprise network 104. Being behind the firewall 108, puts the client devices 106a-106b within the security perimeter of the enterprise network 104. Within the security perimeter, the firewall 108 and other network security systems, such as Security Information and Event Management (SIEM) applications, Intrusion Detection Systems (IDS), and Intrusion Prevention Systems (IPS), among others, can defend the devices in the enterprise network 104 from network threats.

In various examples, a client device 106c of the organization 130 can be connected to the organization 130 from outside the enterprise network 104. For example, the client device 106c can be connected to the network 150 through an Internet Service Provider (ISP), and through the network 150, the client device 106c may be able to connect to a Virtual Private Network (VPN) of the enterprise network 104, or a similar mechanism. Once connected to the VPN, the client device 106c can operate as part of the enterprise network 104, and be defended by the security perimeter of the enterprise network 104. In this example, however, the client devices 106c is simultaneously connect to the network 150 that is between the client device 106c and the enterprise network 104, and thus can still be exposed to security risks that can come from the network 150. Additionally, in some examples, the client device 106c may not need to be connected to the enterprise network 104 to be able to access the services 112a-112b of the service provider 110.

In various examples, the users of the organization 130 can make use of the resources of the organization 130 and the services 112a-112b that the organization 130 subscribes to through the client devices 106a-106c. which may be owned by the organization 130 and provided to the organization's members by the organization 130. In various examples, members can use any client device of the organization 130, and may be able to use multiple client devices. For example, the enterprise network 104 can include user workstations which any member can use to log in and access the member's user account. As another example, a member may have access to a laptop computer and a smartphone, and can log into to either device to access the same user account. Alternatively or additionally, the member can use a client device personally owned by the member to connect to the organization's network to make use of the organization 130 resources.

As noted above, a subscriber of the service provider's services 112a-112b can also be an individual who is not affiliated with or part of the organization 130. The individual may have access to a network-enabled client device 106d, through which the individual can access the services 112a-112b. The individual may have a user account with an ISP that enables the individual to access the network 150. Alternatively or additionally, the individual may have a user account with one or more of the services 112a-112b or The individual is not, however, able to use the client device 106d to connect to the enterprise network 104, because the individual does not have a user account with the organization 130 or credentials that enable the a user account to gain permission to connect to the enterprise network 104.

In various examples, individuals and organizations can subscribe to services provided by different service providers. For example, an organization can use an email service (e.g. Gmail from Google®) from one service provider and a file sharing service (e.g., Dropbox) from a different service provider. In this and other examples, the different service providers can be unrelated, including have separate computing systems for supporting their respective service and being controlled by different entities. In some examples, a user can have separate accounts with each service provider and/or each service provider's service. In some examples, a user may be able to use a common user account to access the services of different service providers.

In some examples, a cloud service can be authorized or unauthorized for use within the organization 130. An authorized service is one that the organization 130 has approved for use. Approval can include, for example, vetting the service through a certification process to ensure the service is secure, establishing a service contract with the service provider 110, placing the service provider 110 on a list of approved service providers, identifying the service provider 110 as a well-known and trusted service provider, and/or controlling the generation of user accounts with the service for the users of the organization 130, among other activities. For example, the service provider 110 can be categorized by the service provider 110 as a "trusted" service provider. In some examples, the organization 130 can categorize other service providers as "untrusted," or categorize all service providers that are not on the trusted list as untrusted. An unauthorized service is one that the organization may not have specifically approved, and that a user is using at the user's own discretion. For example, a user may be using a file sharing service that the organization 130 has not specifically authorized, possibly without the organization 130 being aware that the file sharing service is being used.

In some examples, the services 112a-112b of the service provider 110 can be executed or accessed through an application that can be executed from within the organization 130, and which may be authorized for use within the organization 130. For example, the organization 130 can have an authorized web browser application, through which users can access services such as a file sharing service or a database service. In this and other examples, the web browser application can be referred to as an internal application. In some examples, the internal application can operate cooperatively with the cloud services 112a-112b, including, for example, allowing the services 112a-112b to access data, user account information, or other information within the organization 130. Because the internal application is executing within the organization 130 (for example on client devices 106a-106c of the organization 130), the organization 130 can monitor and control usage of the internal application. The organization 130, however, may not be aware of or be able to monitor users' usage, through the internal application, of the services 112a-112b of the service provider 110.

In some examples, a user can access the services 112a-112b of the service provider 110 through a third-party service provider 114. For example, a user can first access a service 116 provided by the third-party service provider 114, and through this service 116, access the service 112b of another service provider 110 (illustrated here by a dashed arrow). The service 116 of the third-party service provider 114 can be, for example, a portal service that enables users to locate and access the applications and services of other cloud service providers. In some examples, the third-party service provider's service 116 provides access to other service over the network 150 (e.g., data to and from the service 116 that is for the other service 112b is transmitted to and from the other service 112b over the network 150) though the access may appear, from the user's perspective, to be direct. In some examples, the service 116 enables a user to establish a subscription with the other service 112b, after which the user access the other service 112b directly and without needing to access the service 116 of the third-party service provider 114.

Use of the cloud services 112a-112b can create a security risk for the subscribers of the services 112a-112b. For example, hardware, platforms, and software that are operating within the organization can, in most cases, be controlled by the organization and be secured by the organization, for example using physical barriers and/or network security tools. The cloud services 112a-112b, however, operate outside of the organization 130 and outside of direct control by the organization 130. The organization 130 may have little to no visibility into the activities users perform when using the services 112a-112b, or ability to control the actions the users perform. Additionally, the organization 130 may have little or no ability to monitor or control user actions that cause questionable data or unauthorized users to enter the organization 130 by way of the services 112a-112b, or that cause the organization's data to exit the organization 130 through use of the services 112a-112b.

In various implementations, the security monitoring and control system 102 can provide network threat detection and remediation services for subscribers of the cloud services 112*a*-112*b*. In various implementations, the security monitoring and control system 102 can analyze use of services 112*a*-112*b* and identify activities that may be a threat to an organization or individual subscriber. In some implementations, the security monitoring and control system 102 can further suggestion remediation actions, and/or can automatically perform remediation actions to isolate or stop the threat. In some examples, analysis performed by the security monitoring and control system 102 can include determining models of normal and/or abnormal behavior in user activity, and using the models to detect patterns of suspicious activity. In some examples, the security monitoring and control system 102 can simultaneously analyze data from different services and/or from different services providers. In these examples, the security monitoring and control system 102 may be able to detect suspect activity that is only evident when actions performed with different services occurs. In various examples, the security monitoring and control system 102 can determine remedial measures that can be executed at a service provider where suspect activity was detected, or at a different service provider, when the analyses determines actions may need to be taken at other service providers.

In some examples, the security management and control system 102 can be integrated into the computing environment of the organization 130. For example, the security monitoring and control system 102 can executing on a server in the enterprise network 104 and behind the firewall 108 of the organization 130. In these examples, the security management and control system 102 can be administered by the organization's network administrators, and/or by personnel associated with the developer of the security management and control system 102.

Alternatively or additionally, various examples, the capabilities of the security monitoring and control system 102 can be provided as a service to individual and organizations. For example, the network security services of the security monitoring and control system 102 can be offered as web-based cloud service, and/or under a Software as a Service (SaaS) model. In these and other examples, customers can use applications provided by the security monitoring and control system 102, where the applications provide various threat detection and remediation functions. As with the services 112*a*-112*b* of the service provider 110, individuals and organizations can subscribe to the security services provided by the security monitoring and control system 102. In some examples, a group users of the organization 130 can be designated as administrative users, and can manage the operations conducted by the security monitoring and control system 102 in monitoring security for the organization 130. These users may have access information such as reports generated by the security management and control system 102 and the ability perform remediation actions suggested by the security management and control system 102, among other capabilities.

In various implementations, security monitoring and control system 102 can be implemented using a computing system. In these implementations, the computing system can include one or more computers and/or servers (e.g., one or more access manager servers), which may be general purpose computers, specialized server computers (such as desktop servers, UNIX servers, mid-range servers, mainframe computers, rack-mounted servers, etc.), server farms, server clusters, distributed servers, or any other appropriate arrangement and/or combination of computing hardware. The security monitoring and control system 102 may run an operating system and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. Examples of database servers include, those commercially available from Oracle, Microsoft, and other. The security monitoring and control system 102 may be implemented using hardware, firmware, software, or combinations of hardware, firmware, and software.

In various implementations, the security monitoring and control system 102 may include at least one memory, one or more processing units (e.g., processor(s)), and/or storage. The processing unit(s) can be implemented as appropriate in hardware (e.g., integrated circuits), computer-executable instructions, firmware, or combinations of hardware and instructions. In some examples, the security monitoring and control system 102 can include several subsystems and/or modules. The subsystems and/or modules in the security monitoring and control system 102 may be implemented in hardware, software (e.g., program code or instructions executable by a processor) executing on hardware, or combinations thereof. In some examples, the software can be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code. The computer-readable storage media may include instructions stored thereon, that when executed on a processor, perform operations of the security monitoring and control system 102.

In various implementations, the security monitoring and control system 102 can include various modules that implement different features of the security monitoring and control system 102. In the example of FIG. 1, these modules include a scanner 174, a pattern analyzer 176, a learning system 178, a data accesser 182, a data analysis system 136, an information handler system 138, a mapping generator 170, a control manager 172, a log collector system 134, and a interface 120. The security monitoring and control system 102 further includes storage 122, which stores various data that the security monitoring and control system 102 uses. In some examples, the security monitoring and control system 102 can also be connected to additional data stores 180, which can store additional data that the security monitoring and control system 102 may need.

In various examples, the storage 122 of the security monitoring and control system 102 can one or more data stores that store tenant configuration information 124, security information 126, domain information 128, and application information 132. In various examples, the storage 122 can include one or more databases (e.g., a document database, a relational database, or other type of database), one or more file stores, one or more file systems, or a combination of systems for storing data.

In various examples, the tenant configuration information 124 ("tenant config info"), can include configuration information for tenants and tenant accounts, as well as user accounts associated with each tenant account. When, for example, the organization 130 subscribes to the services of the security management and control system 102, the organization can provide the security management and control system 102 with information that identifies the organization's tenant account with the cloud service provider 110. In this example, security management and control system 102 can store the tenant account information in the tenant configuration information 124. In some cases, the organization 130 can also provide a list of user accounts with the service provider 110, which can also be stored in the tenant configuration information 124. Alternatively or additionally, in some examples, the security management and control system 102 can query the service provider 110 to determine the user accounts. In some examples, the security monitoring and control system 102 can use the association between a tenant account and the user accounts for the tenant's users in various ways, including to retrieve information about the activity of users associated with the tenant.

In some examples, the organization 130 can also provide authentication information to the security management and control system 102, where the authentication information can be used to log in to or otherwise access the services 112a-112b of the service provider 110. In various examples, the security management and control system 102 can use the authorization information to access the organization's tenant account 130 with the service provider 110. Authorization information can take the form of, for example, a token (e.g., an OAuth token), a username and password, or another form of credential. In some examples, the organization 130 can specify permissions or privileges with the authorization, which can define the level of access the security management and control system 102 has to the organization's tenant account. For example, the organization 130 can specify that the security management and control system 102 can change security settings for a service provided by the service provider 110, but that the security management and control system 102 cannot generate new user accounts or delete user accounts.

In various examples, the tenant configuration information 124 can store other information for the organization 130, such as, for example security, settings for accessing the services 112a-112b of the service provider 110, log settings, and/or access settings (e.g., security policies, security configurations, and whitelists and blacklists, among other things). In some examples, the organization 130 can specify a security setting for a service based on a level. For example, a security setting at a high level may require that user passwords be "strong," meaning, for example, that the password must include a variety of characters such as upper and lower case, numbers, and/or symbols. Similarly, security settings at different levels may set a session inactivity timer at higher or lower periods of time, such that, when the inactivity timer expires, the user's session is automatically ended, for example.

In some examples, the storage 122 can include security information 126 ("security info") that includes security analysis performed by the security monitoring and control system 102. In some examples, the security information 126 can include separate entries for different customers of the security monitoring and control system 102. In some examples, the security information 126 includes historic data: the results of past analysis (e.g., from the last month, last three months, last year, or some other past time period) which can be consulted when needed. In some examples, the security information 126 can further include records of past security incidents, determinations of whether the past security incidents were actual incidents or false positives, records of remediation actions taken for past incidents, and/or outcomes of performing remediation actions, among other data. In some examples, the security information 126 can further include network threat intelligence data, obtained, for example, from third-party threat intelligence aggregators and distributors.

In some examples, the storage 122 can include domain information 128 ("domain info") about the service provider 110 and other services providers. The domain information 128 can include, for example, a network address or location of the service provider 110, identification information for an owner or operator of the service provider 110 (e.g., the person or organization that owns and/operates the service provider 110) and information for verifying the identity of the service provider 110. The domain information 128 can be obtained, for example, by querying the service provider 110, requesting a certificate from the service provider 110, and/or requesting information from the service provider's ISP or the service provider's hosting service.

In some examples, the storage 122 can include application information 132 ("app info") that records user of a service provider's applications or services. The application information 132 can include, for example data logs collected from the organization 130 and/or activity logs obtained from the service provider 110. The application information 132 can record, for example, actions performed during use of the services 112a-112b of the service provider 110 as well as identification of the users who performed the actions, timestamps for when the actions were performed, network identification of network and/or geographic locations for the users when the users performed the actions, resources affected by the actions, and other information related to use of the services 112a-112b.

In various implementations, the security monitoring and control system 102 may be coupled to or in communication with one or more data stores 180. The data stores 180 may be implemented using any type of persistent storage device, such as a memory storage device or other non-transitory computer-readable storage medium. In some examples, the data stores 180 can include or implement one or more databases (e.g., a document database, a relational database, or other type of database), one or more file stores, one or more file systems, or combinations thereof. The data stores 180 may be implemented by and/or accessible as a service provided by a service provider system. The data stores 180 may include an interface for requesting data related to service or the service's service provider.

In some implementations, the security monitoring and control system 102 can include a log collector system 134 that performs operations for obtaining data on which the security monitoring and control system 102 can perform analysis. In various examples, the security monitoring and control system 102 can use different types of data or data sources for conducting threat analysis. For example, the security monitoring and control system 102 can use data obtained by monitoring the client devices 106a-106c through which the services 112a-112b are used, and/or obtained by monitoring points within an organization's network, such as at routers or the firewall 108. Herein, data obtained from client devices or within the organization's network is referred to as network data. To obtain network data, in some examples, monitoring agents can be placed on the client devices 106a-106c and/or on the network infrastructure of the organization's network. In these examples, the monitoring agents can capture user activity as a user makes use of cloud services.

As another example, the security monitoring and control system 102 can use data logs from the service provider 110. In various examples, the service provider 110 can record user activity as the services 112a-112b of the service provider 110 are used. For example, the service provider 110 can record when users log into a service, a network and/or geographic location for a user when the user logs in, actions performed by the user when the user uses a service, a resource affected by the action, and other information related to use of a service. Data from service providers are referred to herein as activity data or activity logs.

The following examples illustrate some examples of activity data that can be obtained from service providers. The following is a first example of activity data (e.g., an audit log record) that can be obtained from a service provider:

```
"entries": [
{
  "source": {
    "type": "user",
    "id": "222853877",
    "name": "Sandra Lee",
    "login": "sandra@company.com"
  },
  "created_by": {
    "type": "user",
    "id": "222853866",
    "name": "Mike Smith",
    "login": "mike@company.com"
  },
  "created_at": "2016-12-02T011:41:31-08:00",
  "event_id": "b9a2393a-20cf-4307-90f5-004110dec233",
  "event_type": "ADD_LOGIN_ACTIVITY_DEVICE",
  "ip_address": "140.54.34.21",
  "type": "event",
  "session_id": null,
  "additional_details": null
}
```

The following is a second example of activity data (e.g., a shared file audit log record) that can be obtained from a service provider.

```
"entries": [
{
  "type": "event",
  "source": {
    "parent": {
      "type": "folder",
      "id": "0",
      "name": "All Files"
    },
    "item_name": "financial2017Q1.doc",
    "item_type": "file",
    "item_id": "159004949136"
  },
  "additional_details": {
    "service_name": "File Sharing App"
  },
  "event_type": "SHARE",
  "ip_address": "140.191.225.186",
```

```
  "event_id": "234d2f55-99d0-4737-9c3b-1a5256fe7c67",
  "created_at": "2016-12-12T20:28:02-07:00",
  "created_by": {
    "type": "user",
    "id": "238746411",
    "name": "John Smith",
    "login": "john@company.com"
  }
}
```

The following is a third example of activity data (e.g., an audit record) that can be obtained from a service provider.

```
{
  "Records": [
  {
    "eventVersion": "1.03",
    "userIdentity": {
      "type": "IAMUser",
      "principalId": "111122225533",
      "arn": "arn:aws:iam::111122223333:user/john",
      "accountId": "111122223335",
      "accessKeyId": "AKIAIOSFODNN7JOHN",
      "userName": "john"
    },
    "eventTime": "2016-12-26T20:46:31Z",
    "eventSource": "s3.amazonaws.com",
    "eventName": "PutBucket",
    "awsRegion": "us-west-2",
    "sourceIPAddress": "127.0.0.1",
    "userAgent": "[ ]",
    "requestParameters": {
      "bucketName": "myprodbucket"
    },
    "responseElements": null,
    "requestID": "47B8E8D397DCE7D6",
    "eventID": "cdc4b7ed-e171-4cef-975a-ad829d4123c7",
    "eventType": "AwsApiCall",
    "recipientAccountId": "111122223344"
  }
}
```

The following is a fourth example of activity data (e.g., an audit record) that can be obtained from a service provider. 79a59df900b949e55d96a1e698fbacedfd6e09d98eacf-8f&15218e7cd47efcde myprodbucket [06/Feb/202017:00:01:57+0000] 192.0.2.3 Mary DD6CC733AMARY REST.GET. OBJECT s3-dg.pdf "GET/mybucket/financial2016Q4.pdf HTTP/1.1" 200--4406583 4175428 "-" "S3Console/0.4"—

In some examples, the security monitoring and control system 102 can use data from other data sources, such as third-party feeds from network sources other than the organization's network or the service provider 110. Examples of other network sources can include network security data aggregators and distributors, social networking systems, news reporting or aggregating systems, governmental systems, reputation systems, and other systems.

In various implementations, the log collector system 134 can perform operations to obtain network data and/or activity data. For example, the log collector system 134 can be configured to communicate with software agents placed with the enterprise network 104 to network data logged by these agents. In this example, the network data can include network traffic generated as a user uses the services 112a-112b of the service provider 110 or the services of another service provider. In some examples, the network data can include other network traffic, such as network traffic generated as a user uses other network resources, such as resources of the organization 130 or resources on the Internet, such as websites. As another example, the log collector system 134 can be configured to communicate with the service provider 110 to obtain activity logs from the service provider 110. The service provider 110 can have, for example, and Application Programming Interface (API) that enables the log collector system 134 to request activity logs. In these examples, the log collector system 134 may be able to use the credentials of a tenant account with the service provider 110 to request the activity logs; that is, the log collector system 134 can pose as a tenant of the service provider 110 and make a request in the same way as would the tenant.

In various implementations, data obtained by the log collector system 134 can be processed by a data analysis system 136 in security monitoring and control system 102. The data analysis system 136 can conduct analysis on network data and activity data to perform operations such as discovery of applications being used, activity pattern learning and recognition, anomaly detection, and network threat detection, among other operations. These and other operations that can be performed by the data analysis system 136 are discussed further below.

In various implementations, the information handler system 138 of the security monitoring and control system 102 manages the data in the storage 122, including, for example, storing data, locating and retrieving data, organizing data, and updating data, among other operations. In some examples, the information handler system 138 received data from users of the organization 130, such as administrative users, who can provide information such as lists of the organization's users and data about the users. The data about the users can include, for example, roles or privileges for a user. In these and other examples, the information handler system 138 can manage storing of the user data in the appropriate data store in the storage 122.

In various implementations, the mapping generator 170 performs security analysis the organization 130 or another customer of the security monitoring and control system 102. For example, the mapping generator 170 can operate on output of the data analysis system 136 and compute a measure of security for a service, a user, a tenant, or combinations of services, users, and/or tenants. In some examples, the mapping generator 170 can obtain data from the interface 120 to perform security analysis. Security analysis operations are discussed further below.

In various implementations, a control manager 172 in the security monitoring and control system 102 can act on behalf of the organization 130 to manage access to the services 112a-112b of the service provider 110 by the organization's users. In various examples, the control manager 172 can provide this service for multiple cloud services or any cloud service that the organization's users use. In some examples, the control manager 172 can use access policies to control users' access to the services 112a-112b. An access policy can define, for example, types or categories of users that can or cannot use a service, specific users that can or cannot use a service, times of day or days of the week when a service can be used, an amount of data that can be transferred to or from the services, an amount of data bandwidth that can be used, actions that can or cannot be performed in using the service, to which users the access policy applies, and/or other restrictions or permissions with respect to the service. In various examples, the control manager 172 can maintain a set of policies for each organization that subscribes to the services of the security management and control system 102. In some examples, the control manager 172 can provide pre-sets with different levels of security, where selecting a pre-set selects the security configuration for one or more services. In these examples, the organization's selection of a pre-set can affect some or all of the organization's users ability to use the services.

In some examples, the control manager 172 can also maintain security policies for the organization 130. A security policy can define an action or set of actions that, when detected, constitute a security violation or an event that otherwise requires attention. In some examples, actions that are defined by a policy as a security violation can occur through use of one service, meaning that all the actions were performed while using the same service. In some examples, the actions can have occurred during use of more than one service, where the services are provided by one service provider or multiple service providers. In some examples, a security policy can also define one or more remediation actions to perform when a violation of the policy is detected. A remediation action can include, for example, sending a notification to the user who caused the violation, to network administrators of the organization 130, to administrators of the security management and control system 102, and/or to another entity.

In some examples, remediation can include modifying access to a service or to multiple services. For example, a remediation action can include preventing a particular user from using a service, or preventing all users of the organization 130 from using the service. As another example, a remediation action can include limiting the actions that can be performed in using a service. In some examples, performing a remediation action can include sending instructions to the enterprise network 104. In these examples, the instructions can, for example, configure a client device or a network infrastructure device such as the firewall 108. The client devices 106a-106c and/or the network infrastructure devices may, in some examples, be executing a software agent that enables the control manager 172 to communication with the devices, and make modifications to the devices. Modifications can include, for example, restricting access to a domain or Internet Protocol (IP) address, blocking all network traffic, disabling the device, or making some other modification to the device.

In some examples, performing a remediation action can include sending instructions to the service provider 110 to modify access to the services 112a-112b. In these examples, the remediation action can include determining instructions to send. For example, the control manager 172 can examine an API of the service provider 110 and/or of a service to identify instructions that can be performed to cause a desired change to the service. In this example, the API can define instructions that can, for example, prevent or limit access to the service by a user or a group of users of the organization 130. As another example, the API can define instructions that can disable or enable certain functionality of the service, wherein the disabling or enabling affects one or more users of the organization 130. In these and other examples, the modification to the service affects the users of the organization with which the remediation is associated, and does not affect the users of a different organization.

In various implementations, the security monitoring and control system 102 can include a learning system 178. The learning system 178 can apply various machine learning algorithms to data collected by the security monitoring and control system 102. The information learned about the data can then be used, for example, by the data analysis system 136 to make determinations about user activities in using services provided by the service provider 110. For example, the learning system 178 can learn patterns of normal or common behaviors of users of an organization. In these and other examples, the learning system 178 can generate models that capture patterns that the learning system 178 has learned, which can be stored in the storage 122 along with other data for an organization.

To support the learning system 178, in some implementations, the security monitoring and control system 102 includes a scanner 174 and a pattern analyzer 176. In these implementations, the scanner 174 can, for example, scan data for particular types of information. For example, the scanner 174 can extract the activities of a particular user, group of users, class of users, and/or all users associated with a particular tenant. As another example, the scanner 174 can extract activities relating to use of a particular service or set of services. As another example, the scanner 174 can extract activities relating to a particular service provider. In various implementations, the pattern analyzer 176 can use the data extracted by the scanner 174 to identify patterns in the data. For example, users and/or organizations may use services in repetitive ways or in cyclical ways. In these examples, the pattern analyzer 176 can identify repetitive behavior, and identify these patterns of behavior to the learning system 178.

In some examples, a data accesser 182 in the security monitoring and control system 102 can communicate with service providers to obtain activity data from those service providers. The activity data may be for a user account, a tenant account, a group account, or another type of account. The activity data may be obtained for a service, a particular type of data (e.g., a data for a particular attribute), one or more users, or combinations services, service providers, attributes, users, or other factors. In some examples, the data accesser 182 may process data to identify activity related to one or more criteria, such as one or more services, a particular type of data (e.g., a data for a particular attribute), one or more users, or combinations thereof.

In various implementations, the security management and control system 102 provides an interface 120 through which customers of the security management and control system 102 can use the services of the security management and control system 102. The interface 120 can provide, for example, a graphical user interface (GUI) that can display a control panel or dashboard that enables the organization's administrative users to configure the services of the security management and control system 102. The graphical user interface can further enable the administrative users to view reports of user activity with respect to the services 112a-112b of the service provider 110. The graphical user interface can further provide reports of security events and suggest remediation actions, and/or report on the outcome of remediation actions that the security management and control system 102 automatically performs. The graphical user interface can be implemented, for example, as software application that can be executed on the client devices 106a-106c of the organization 130. Alternatively or additionally, the graphical user interface can be implemented as a web-based interface (e.g., a website).

In some examples, the interface 120 can alternatively or additionally provide an API through which the organization 130 can manage the services provided by the security management and control system 102. The API can define actions to, for example, pull reports on user activity in using cloud services, pull reports on security events, issue instructions for remediation actions, obtain statistics on user activity, and/or other actions related to the services of the security management and control system 102. The API of the interface 120 can enable an organization to, for example, integrate the capabilities of the security management and control system 102 into the security infrastructure of the organization 130.

A system for security monitoring and control, in various implementations, can include multiple components that may be located on a single hardware platform or on multiple hardware platforms that are in communication with each other. Components can include software applications and/or modules that configure a server or other computing device to perform the operations of the security management and control system 102.

Figure 2:
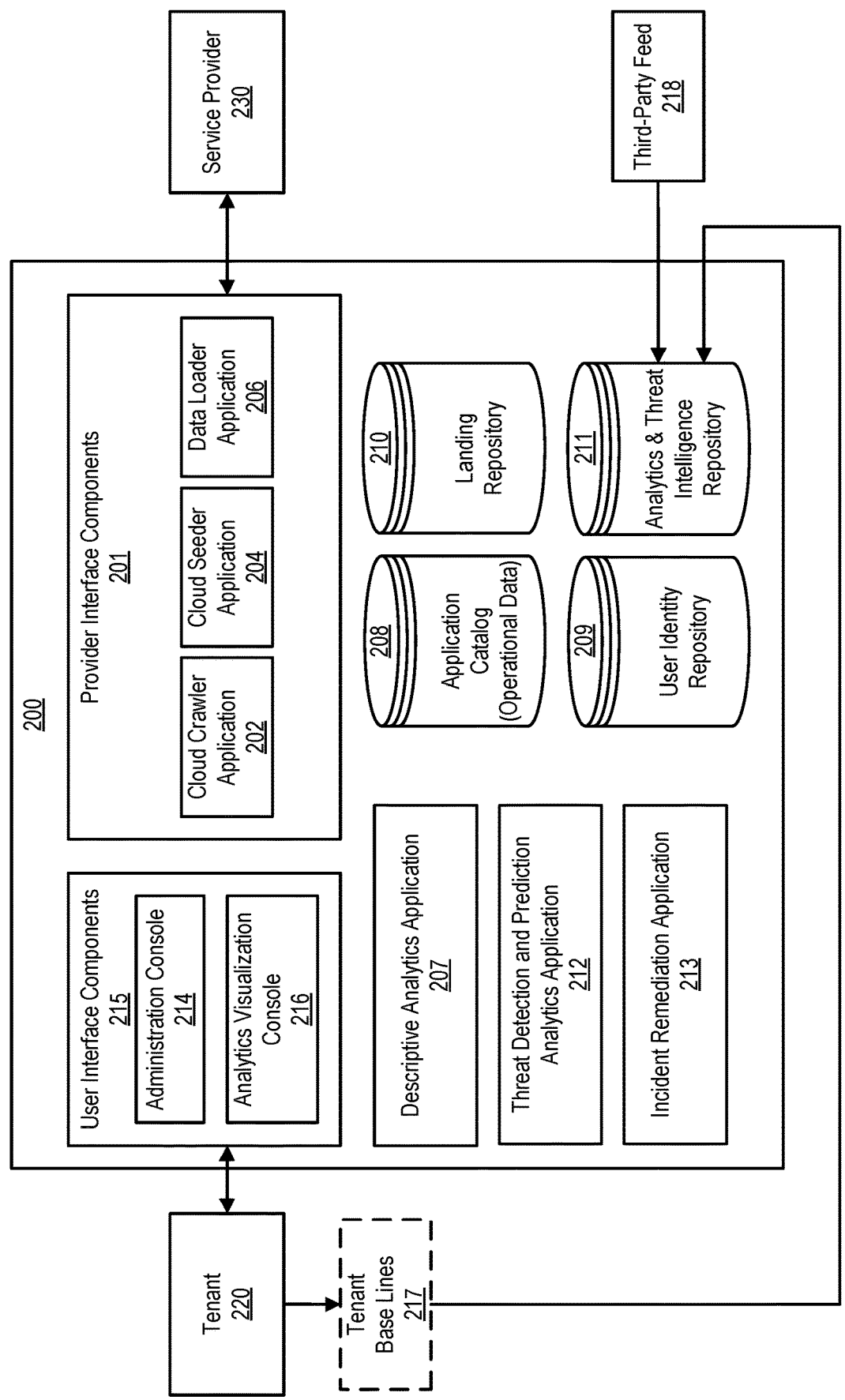
FIG. 2 illustrates a block diagram of an example cloud security system that can be implemented by a security management and control system.

FIG. 2 illustrates a block diagram of an example cloud security system 200 that can be implemented by a security management and control system. In various implementations, the example cloud security system 200 can conduct network threat analysis for a tenant 220 of a service provider 230, and determine whether actions by users of the tenant 220 in using a service of the service provider 230 constitute a network threat. In various implementations, the cloud security system 200 can include user interface components 215 for interfacing with a tenant 220 and provider interface components 201 for interfacing with a service provider 230. On the back end, the cloud security system 200 can include various applications for conducting analytics and data stores for storing data used in the analytics.

In the context of the example of FIG. 2, the tenant 220 is a tenant of the service provider 230, meaning that the tenant 220 is using a service of the service provider 230. When the cloud security system 200 is provided as a cloud service, the tenant 220 can also be a tenant of the cloud security system 200, n that the tenant 220 is using the services of the cloud security system 200.

In various examples, the user interface components 215 include an administration console 214 and an analytics visualization console 216. Using the administration console 214, the tenant 220 can configure the security controls for the services of the service provider 230. Configuration of the security controls can include, for example, enabling or disabling or disabling access to the service by the tenant's users, enabling or disabling features of the service that the tenant's users can use, and other configurations that are available to the tenant 220. The analytics visualization console 216 can be used to view analytics generated by the cloud security system 200. For example, using the analytics visualization console 216, the tenant 220 can view reports of security incidents involving the tenant's users and a service to which the tenant 220 is subscribing. In various examples, the information displayed in the administration console 214 and the analytics visualization console 216 can be obtained from the data stores of the cloud security system 200.

In various implementations, the administration console 214 can provide the tenant 220 with a normalized view of controls for multiple cloud service and/or cloud service providers. The administration console 214 can include a user interface that displays a simplified view of controls for different cloud services on the same screen. Information provided to the administration console 214 can be retrieved from an application catalog database 208 using metadata based schema mapping. In some examples, administration console 214 can be used to assign consistent access policies across cloud services. In these examples, administration console 214 can display controls and/or set controls according to specified classifiers, such as, for example, standard, stringent, or custom, among others. In this example, a higher level classification corresponds to more stringent controls. In some examples, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In some examples, the administration console 214 can also provide for plug-in interfaces to integrate with SaaS, PaaS, and native applications.

In various implementations, the analytics visualization console 216 can display security indicators in a library format with risk factors that are color coded (such as red, green, yellow). Other statistics or metrics may be displayed such as, for example, user logins attempts, groups with the most newly added users, deleted files, users with the most deleted files, and/or users downloading the most files, among other metrics. Some types of information may be specific to a particular service provider. For example, for Salesforce.com, the metrics can include the identities of users that are downloading opportunity or budget data, contracts, or contacts. In some examples, the analytics visualization console 216 provides a unified view of security controls for a tenant's cloud services. The analytics visualization console 216 may display a values set for any or all security controls set for different cloud services, as well as deviations of the current values from values associated with predetermined policies or configurations.

In various examples, the provider interface components 201 can applications that the cloud security system 200 can use to interface with the service provider 230. These components can include a cloud crawler application 202, a cloud seeder application 204, and a data loader application 206.

In various examples, the cloud crawler application 202 can retrieve information about security controls from the service provider 230. Data retrieved by the cloud crawler application 202 can be entered into an application catalog database 208. Retrieving information can include, for example, sending requests to the service provider 230 that are formulated to ask the service provider 230 for the security controls that are available for a service, and any available settings for the security controls. Alternatively or additionally, the service provider 230 can include an API through which the cloud crawler application 202 can obtain security controls for a service. In various examples, a cloud crawler application 202 can retrieve software defined security configuration data from the service provider 230. Software defined security configuration data can describe the configuration of security controls for a particular service. Security controls are mechanisms that restrict access to the application and/or data housed by the cloud service provider. For example, software defined security configuration data can include data describing roles that are defined for users, groups, and grouping of users; encryption keys; tokens; access controls; permissions; configurations; types of authentication policies; mobile access policies; and many other types of security controls.

In various examples, the cloud crawler application 202 can connect to the service provider 230 in order to obtain software defined security configuration data. The service provider 230 may require authorization or some other manifestation of consent for access to the service provider's systems. Authorization may be provided by a token (such as using the Open Authorization (OAuth) open standard for authorization) or by credentials (such as a username and password). The token or credentials can be that of the tenant 220, or a token or credential associated with the cloud security system 200. Various other techniques can be used to authorize access to a cloud provider's system and data. The connection may also include providing a service Uniform Resource Locator (URL).

In various examples, the software defined security configuration data can be collected by using an API of the service provider 230. Examples of APIs and classes of APIs include Representational State Transfer (REST), Java 2 Platform, Enterprise Edition (J2EE), Simple Object Access Protocol (SOAP), and native programmatic methods (such as native application API's for Java), among others. The information could also be requested using other techniques, such as scripting languages (such as Python and PHP), deployment descriptors, log files, database connectivity through Java Database Connectivity (JDBC) or REST, and resident applications (such as cloud beacons). The information that is sent or received can be represented in a variety of format, such as, JavaScript Object Notation (JSON), Extensible Markup Language (XML), or Comma Separated Values (CSV), among other formats.

Table 1 below provides an example of some security controls provided by cloud services providers Box and Amazon Web Services (AWS). Other cloud services providers can have similar security controls or other security controls.

TABLE 1

| Security Controls | Support in Box | Support in Amazon Web Services (AWS) |
|---|---|---|
| Users/Group Management | REST (Representational State Transfer) API | AWS IAM (Identity and Access Management) APIs |
| Credentials and Identifiers | N/A | Secure and monitor Accounts, tokens, keys etc. |
| Login/Logout Events | REST API | AWS CloudTrail - Events API and Log files |
| IP address of the clients | REST API | AWS CloudTrail - Events API and Log files |
| Device (iphone, ipad etc) used by the clients | REST API | AWS CloudTrail - Events API and Log files |
| Password Policies | REST API | AWS IAM policies |
| Resource Access Permissions | Resources: Files, Folders Actions: Editing, Preview, upload, collaboration events | Resources: EC2, S3, EBS Actions: Create, Access, Restart, Terminate, etc. IP address based access controls |

TABLE 1-continued

| Security Controls | Support in Box | Support in Amazon Web Services (AWS) |
|---|---|---|
| Restrict or limit Mobile access | Limit users from saving content for offline access | AWS IAM policies |
| Roles | BOX has pre-defined admin roles | Roles can be created using pre-defined policies |

Table 2 provides an example of some of the security controls and supported access for cloud services provider Salesforce.com. Other cloud services providers can use similar or other security controls and access controls.

TABLE 2

| Security Controls | Support in Salesforce.com |
|---|---|
| Users/Group Management | SalesForce User/Group/Profiles APIs |
| Credentials and Identifiers | APIs: Setup changes |
| Login/Logout Events | APIs: Audit activity |
| IP address of the clients | APIs: Audit activity |
| Device (iphone, ipad, etc.) used by the clients | API to manage Setup changes |
| Password Policies | APIs: Setup changes |
| Resource Access Permissions | Salesforce object monitoring using object history |
| Restrict or limit Mobile access | APIs to manage Setup changes |
| Roles | Salesforce Profiles |

In various examples, the cloud crawler application 202 can generate security controls metadata from the software defined security configuration data obtained from the service provider 230. The security controls metadata is normalized descriptors for entering the information into a common database such as the application catalog database 208. The security controls metadata can be categorized (e.g., mapped into categories) and indexed. The categorization may comply with a standard specified by a security organization and/or may be certified and/or audited by a third party. In addition, the security controls metadata and/or the categorization of metadata may be formulated around the requirements of a particular regulation or standard. For example, regulations and standards such as the Health Insurance Portability and Accountability Act (HIPAA), the Sarbanes-Oxley Act, the Federal Risk and Authorization Management Program (FedRAMP), and/or the Payment Card Industry Data Security Standard (PCI DSS) may require reporting and audit trails. The security controls metadata can be formatted in a way to display the types of information required by the regulations and standards and facilitate the generation of reports needed.

The security controls metadata can be stored in the application catalog database 208. In some examples, the application catalog database 208 is an Apache Cassandra database, an open-source NoSQL database management system designed to handle large amounts of data across many commodity servers. In some examples, the application catalog database 028 is implemented using types of databases appropriate to the application. In some examples, a variety of databases can be used to store an application catalog for later retrieval, report generation, and analytics generation.

In various implementations, other methods can be used to retrieve software defined security configuration data and to generate security controls metadata. Additionally, various types of controls and mechanisms for retrieving software defined security configuration data may be supported by different cloud service providers. For example, other cloud applications such as Office 365, GitHub, Workday, and various Google applications use retrieval mechanisms specific to a service. Furthermore, processes for retrieving software defined security configuration data can be automated, depending on what is supported by a cloud service provider.

In various implementations, the cloud seeder application 204 can be used to implement security policies for the tenant 220. The cloud seeder application 204 can, for example, set security controls for a tenant's accounts with the service provider's services The security controls can affect, for example, one user account, multiple users accounts, or all user accounts. In some examples, the cloud seeder application 204 can set security controls in various situations. For example, the cloud seeder application 204 can set security controls as part of remediation of a threat or when called on by the tenant 220. In various examples, the cloud seeder application 204 can be used to coordinate consistent access policies across cloud services. In some examples, security controls can be coordinated across several accounts that an organization has with different service providers. For example, different levels of security may be defined such that, when a higher or lower level of security is selected, the security controls for an organization's accounts with different cloud services are all set to reflect the higher or lower level of security. In this way, a unified policy and security controls configuration can be enforced. The values for various security controls at different levels of security can be defined by input into a user interface, such as a controls management platform discussed above, and the values associated with the security controls at each level of security can be stored in a database. A user interface can be provided to show security controls for an organization's account with a cloud service and the assignment of security control values at a security level. As an example, security controls at a "stringent" level of security can include password requirements for a user account such as ten minimum characters, two numbers, one special character, one uppercase letter, no reuse of the last ten passwords, etc.

In various implementations, the data loader application 206 can retrieve activity data for the tenant 220 from the service provider 230. The activity data can come from logs generated by the service provider 230 as the tenant's users use the service providers services. In various examples, the data loader application 206 can obtain the activity data by requesting the data from the service provider 230. The data retrieved by the data loader application 206 can be entered into a landing repository 210 and/or analytics and threat intelligence repository 211. The data entered into a landing repository 210 may be in different formats and/or have different ranges of values, due, for example, from having been collected from different service providers. In some examples, the data from the data loader application 206 can be reformatted and/or structured before being moved to the analytics and threat intelligence repository 211 so that, for example, the data has a uniform format.

In various examples, the data loader application 206 can obtain activity data by connecting to and communicating with the service provider 230. In various examples, the connection is made over an encrypted communication channel. In some examples, the connection can be authenticated by a token or using login credentials, or another authentication method. In some examples, collection of activity data is scheduled to occur periodically (e.g., every four hours, every six hours, or at some other time interval). In some examples, the schedule for collection is configurable by the tenant 220. In some examples, the data loader application 206 collects data in real time as events occur, using a real-time computation system such as, for example, Apache Storm, open source distributed real-time computation system. The data loader application 206 may be configured to designate certain events or activities as high risk events, and these events can be retrieved near real-time, outside of the scheduled retrieval interval.

In various examples, activity data can include various types of information about the user of the service provider's services. For example, activity data associated with user accounts can include information relating to the use of, and/or actions taken with, a user account for a service. In this example, the activity data can include sources of information such as user logs and/or audit trails. More specific types of activity data can include, for example, login and logout statistics (including attempts and successes), file operations, access metrics, network download/upload metrics, application metrics (e.g., use, operations, functions, etc.), IP addresses used to access a service, devices used to access service, and/or cloud resources that were accessed (such as, for example, files and folders in a file management cloud application [such as Box], employees and contractors in a human resource cloud application [such as Workday], and/or contacts and accounts in a customer relationship management cloud application [such as Salesforce]). In various examples, activity data can include the user account or other user identifier for the user associated with the events or statistics. In various examples activity data can include information about system status or activity of a cloud system such as, for example, server activity, server reboots, security keys used by a server, and system credentials, where this information is visible or accessible to a system using authorized credentials.

In some examples, activity data may also include information about the security configuration of a tenant account, possibly including the security configuration of user accounts associated with the tenant account. The security configuration can include the values to which security controls for a tenant and/or user accounts associated with the tenant are set.

In various examples, the data loader application 206 can store retrieved activity data in the analytics and threat intelligence repository 211. The analytics and threat intelligence repository 211 can be any database or data repository with query capability. In some examples, the analytics and threat intelligence repository 211 is built in a NoSQL based infrastructure such as Apache Cassandra or another distributed data processing system, although any data warehouse infrastructure may be used as appropriate for the application. In some examples, the data is first entered into the landing repository 210 and reformatted and/or structured before being moved to the analytics and threat intelligence repository 211.

In some examples, the activity data may be received in different formats that are used by different service providers or services. For example, the data may be formatted in JSON or other data interchange formats, or may be available as log files or database entries. In some examples, the data loader application 206 performs operations for normalizing the data and reformatting the data into a common format for storage in, and retrieval from, the analytics and threat intelligence repository 211. Reformatting the data may include categorizing and structuring the data into the common format. In some examples, the database is adaptive to structural changes and new values, and can run automated processes to check for changed data. In some examples, the cloud crawler application 202 recognizes differences in the structure or values of the data retrieved, and can apply the changes to the application catalog database 208 and/or the analytics and threat intelligence repository 211.

In some examples, the data loader application 206 can pre-generate system reports. The system reports can be generated by jobs (e.g., processes) that are scheduled to run on the data set at periodic intervals. Data stored in an application catalog database 208 and/or analytics and threat intelligence repository 211 can be used to generate a variety of reports. Categories of reports can include, for example, authentication and authorization, network and device, systems and change data, resource access and availability, malware activity, and failures and critical errors, among others. Reports can be based on various attributes such as, for example, per application, per user, per secured resource, and per device used for access, among others. Reports may highlight recent changes such as updated features in a cloud application or newly modified policies. Reports may be pre-generated by scheduled jobs (e.g., for performance reasons) or may be requested by a user or administrator.

In some examples, reports include analytics generated on the data. Analytics may use Apache Software Foundation technologies such as Hadoop, Hive, Spark, and Mahout or other features as available in the data storage framework used. In some examples, the R programming language is used to generate analytics. In some examples, the generation of analytics includes the use of machine learning algorithms, proprietary algorithms, and/or external threat intelligence from external commercial sources such as FireEye and Norse or public threat intelligence communities such as Zeus and Tor.

In various implementations, the aggregation of activity information in the analytics and threat intelligence repository 211 concerning access patterns and other event statistics enables the system 200 to establish baselines of behavior. Machine learning techniques, for example, can be applied to detect threats and provide recommendations concerning how to respond to threats. Threat models can be developed to detect threats that are known or unknown or emerging. Threats can also be identified by comparing activity data with external threat intelligence information, such as information provided by third-party providers, as discussed further below. In various examples, data in the analytics and threat intelligence repository 211 can further be used to generate reports that may be presented visually to a system administrator via a user interface and to generate analytics for determining threat levels, detecting specific threats, and predicting potential threats, among other things.

In some examples, a single user of the tenant 220 can have multiple accounts with the service provider 230 and/or with the services provided by the service provider 230. In various examples, the various user accounts of one user can be associated together in a user identity repository 209. In some examples, the user identity repository 209 can group together the user accounts the user has with multiple service providers. In some examples, the tenant 220 can have a tenant account with the service provider 230. In these examples, the user identity repository 209 can associate users of the tenant 220 with the tenant account, which can associate the user accounts of the users with the tenant account as well. The association of user accounts to tenant accounts may be used in various ways, such as retrieving information about the user activity of the tenant's users. In some examples, the tenant account's credentials with the service provider 230 may be used to log into the service provider 230 to retrieve activity data for user accounts that are associated with the tenant account.

In various implementations, the user identity repository 209 can also be used to facilitate tracking of user activity and generation of profiles, where a profile can describe a particular user's use of a cloud service or of multiple cloud services. In some examples, the cloud security system 200 can use the profile of a user to take actions that affect multiple cloud services. For example, the cloud security system 200 can preemptively alert a system administrator when a user's activity in using several cloud services may be a security risk. Alternatively or additionally, as another example, the cloud security system 200 can proactively secure other services on which a user maintains data by applying remedial measures, such as adding additional steps to authentication, changing passwords, blocking a particular IP address or addresses, blocking email messages or senders, or locking accounts, among other things.

In various implementations, the cloud security system 200 can include applications or software modules to perform analytics on data collected by the cloud security system 200. The applications or software modules may be stored in volatile or non-volatile memory and, when executed, can configure a processor to perform certain functions or processes. These applications can include a descriptive analytics application 207 and a prediction analytics application 212. In some examples, the descriptive analytics application 207 can generate analytics such as statistics on users, user activity, and resources used by the users. In some examples, the threat detection and prediction analytics application 212 can generate analytics using machine learning and other algorithms. The analytics performed by the prediction analytics application 212 can include identifying and predicting security threats from patterns of activity and behavioral models. Analytics performed by the descriptive analytics application 207 and the prediction analytics application 212 can be performed using data stored in the analytics and threat intelligence repository 211.

In various implementations, the cloud security system 200 can include remediation functions that provide manual and/or automated processes for responding to threats. In some examples, analytics can use information received from tenant systems that describes threat intelligence provided by the tenant. These sources, which are referred to in the example system 200 as tenant base lines 217, can include information such as specific IP addresses to watch or block, users to watch or block, email addresses to watch or block, software vulnerabilities to monitor, browsers or browser versions that can be susceptible to misuse, and/or vulnerable mobile devices or versions of mobile hardware or software, among other things. In some examples, analytics can use information received from an external third-party feed 218. The source of the third-party feed 218 can be, for example, a threat intelligence aggregator or distributor. The information from the third-party feed 218 can be used to augment the threat analytics of the cloud security system 200 by providing external information about security threats. The external information can include, for example, identification of infected node points, malicious activity from a particular source IP address, malware infected email messages, vulnerable web browser versions, and known attacks on clouds, among other things.

In various implementations, an incident remediation application 213 can be used to coordinate and/or perform remediation actions in response to detected threats. In some examples, the incident remediation application 213 may be called when a recommended remediation action is presented and selected in an alert. The incident remediation application 213 may perform the selected remediation action or instruct another application, such as a cloud seeder application 204, to perform the selected remediation action. When the selected remediation action is to be manually performed or is external to the security system 200, the incident remediation application 213 can track the status of the remediation action and whether the remediation action is complete. In some examples, the incident remediation application 213 can be used to store the results of a manual or automated remediation action. In some examples, a selected remediation action is to be performed by a system external to the security system 200, such as by a third-party's or a tenant's incident remediation system. In these examples, the incident remediation application 213 can instruct or invoke the third-party's or tenant's incident remediation system to perform the action. For example, the incident remediation application 213 may have access to an automated integration process of the third-party or the tenant 220.

Figure 3:
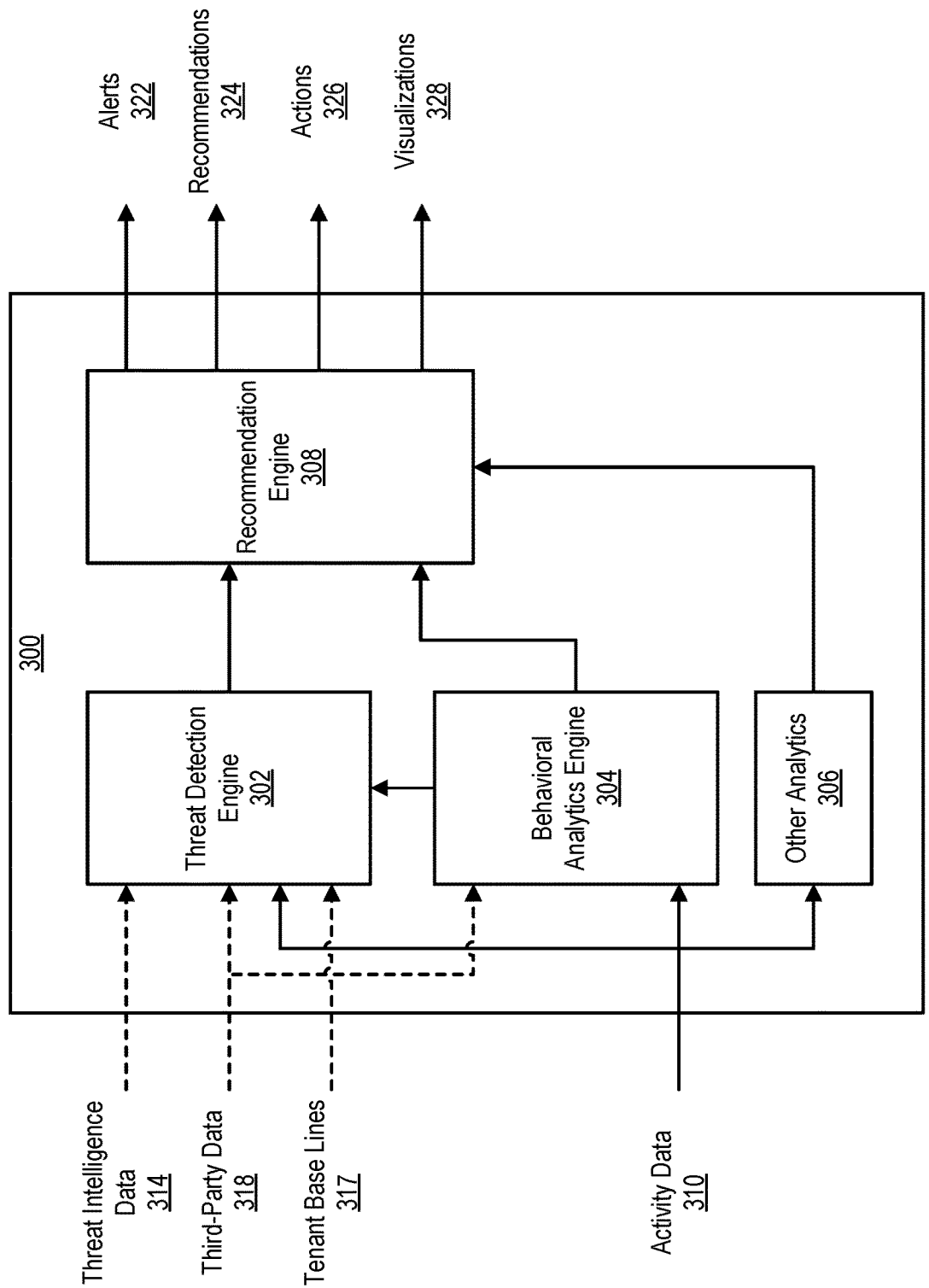
FIG. 3 illustrates a block diagram of an example analytics engine of a security management and control system.

FIG. 3 illustrates a block diagram of an example analytics engine 300 of a security management and control system. In various examples, the analytics engine 300 can analyze various data sources to identify network threats for an organization whose users are using cloud services. In various examples, the operations of the analytics engine 300 can be used to detect and/or address various treat scenarios.

One example of a threat scenario is IP hopping. In an IP hopping scenario, an attacker may use one or more proxy servers to hide the attacker's true location or machine identity before mounting an attack. Detection of this type of scenario can involve geographic resolution (e.g., identifying or looking up a geographic location associated with an IP address) of each IP connection used to connect to a cloud application. Detection can further include detecting anomalous characteristics in the spatial data, and predicting a threat from this information. Metrics used for detection can include, for example, a count of the number of unique IP addresses used by a user per day and/or a velocity, which can refer to the time difference between the use of different IP addresses and the/or duration that each IP address used.

Another example of a threat scenario is an unusual geolocation scenario. An unusual geolocation scenario may refer to activities being originated in locations that are unexpected or outside of an established pattern. This scenario may include activities such as, but not limited to, successful logins or file upload/download from unusual geolocations.

Another example of a threat scenario is a brute force attack. An example of a brute force attack is when an attacker's attempts to try many passwords in order to discover a correct password and compromise a user account. Detection may involve evaluating the velocity of failed login attempts and patterns in event activities to predict a brute force attack. In some examples, brute force attacks may have different speeds, such as a slow attack speed or fast attack speed. Metrics for detection can include, for example, an unusually high number of login failures for existing valid accounts and/or an unusually high number of login attempts with invalid or terminal/suspended usernames.

Another example of a threat scenario is an insider threat. Insider threats can refer to security breaches perpetrated by a person from within a network. For example, an employee of an organization, who has been authorized, through the course of employment with the organization, may misuse the authorization and intentionally or unintentionally case a security breach. Detection of an insider threat can involve tracking a user's normal behavior and generating alerts when events or activities associated with the user's account or accounts deviate from the norm. Metrics can include, for example, an usually high use of corporate resources such as a high number of downloads and/or an employee with a low rating downloading or sharing an unusually high number of files/folders, deleting code from a source code control system, or downloading, deleting, or modifying customer information, among other things.

Another example of a threat scenario is application misuse. Application misuse is a scenario that can include events associated with a terminated or suspending employee (e.g., use of an expired or revoked user account, use cryptographic keys such as a Secure Shell (SSH) key, etc.) or a malware-infected device performing an unusual number of file downloads/uploads using valid credentials, but an unusual geo-location or IP address, for example.

While specific threat scenarios and types of information that can be used to discern these scenarios are discussed above, one skilled in the art would recognize that threat detection and prediction may utilize any of a variety of information and formulas.

In various examples, the analytics engine 300 can detect the threat scenarios discussed above, as well as other threat scenarios, by examining various external and internal data sources. External data sources can provide activity data 310 obtained from cloud service providers. In some examples, external data can optionally include tenant base lines 317 and third-party data 318. In some examples internal data sources can include data models determined by a behavioral analytics engine 304 and can optionally include threat intelligence data 314 maintained by the security management and control system.

In various examples, cloud services can store user activities as user use the cloud services. For example, a cloud service can store each occurrence of a user logging in to use the service, the actions the user performs while using the service, the resources affected by the actions, data that is moved into, out of, or within the service, and/or the user logging out at the end of a session, among other things. In these and other examples can store the user's activities in a log file, which is referred to herein as an activity log. An entry in an activity log can include, for example, an action performed or a description of an action performed, identification of a user who performed the action, a resource affected by the action, the time at which the action was performed or what time the action was initiated and/or completed, and/or a network location or geolocation for the user who performed the action, among other information. In the example of FIG. 3, the activity data 310 can include activity logs for multiple services and/or multiple service providers. In these and other examples, one activity log can include user activity for one service or for multiple services provided by the same service provider.

In various examples, the analytics engine 300 receives updated activity data 310 once per day, every other day, or periodically over another time interval. In some examples, the analytics engine 300 receives activity data 310 when certain events occur, such as a service indicating that an event has occurred (e.g., the service has been updated or the service has detected a network threat or another event originating at the service), the organization indicating that an event has occurred (e.g., the organization having added users to the service or a network administrator requesting an updated analysis or another event originating at the organization), or the security management and control system indicating that an event has occurred (e.g., receipt of new threat intelligence data 314 or another event originating at the security management and control system.

In some examples, activity logs from different cloud services may have different formats. For example, entries in one activity log may be provided as comma-separated values, while another activity log may use JSON syntax. In these and other examples, the data in the activity logs may be normalized by the analytics engine 300 or prior to being provided to the analytics engine 300. Normalizing the activity data 310 include reformatting the activity data 310 such data from different services and/or service providers is comparable, has the same meaning, and/or bears the same significance and relevance. After normalization, the behavioral analytics engine 304 can aggregate and compare data from different cloud services in meaningful ways. For example, a series of failed login attempts by one user with one cloud service may be deemed not to be a threat. However, a series of failed logins by the same user but at multiple different cloud services indicate a concerted effort to crack the user's password and should thus set off an alarm.

In various examples, the activity data 310 can be ingested in the analytics engine 300 by a behavioral analytics engine 304. In various implementations, the behavioral analytics engine 304 can collect statistics from the activity data 310 and identify behavioral characteristics from the activity data 310. Statistics can include, for example, counts of actions, such as successful login attempts or failed login attempts. In some examples, statistics can be associated with a particular service provider, a particular service, a particular user, a particular action that can be performed in using a service, a particular time frame, other factors, and/or a combination of factors.

In various implementations, the behavioral analytics engine 304 can use statistical data generated from the activity data 310 to determine activity profiles, which are also referred to herein as behavioral profiles. For example, the behavioral analytics engine 304 can generate an activity profile that describes the common or typical usage pattern of a service by the users of a particular organization. As another example, the behavioral analytics engine 304 can generate an activity profile for a particular user or group of users. In this example, the activity profile can describe a user's activity in using one service or multiple services. In various examples, to identify a user's activity across services, the behavioral analytics engine 304 can have access to user identity data, which can link together a particular user's accounts with different cloud services the user identity data can include, for example, the user's username or other form of identification with each cloud service. In various examples, the user identity data can be provided by an organization. Alternatively or additionally, in some examples, the security management and control system can automatically determine that different user accounts are related. For example, the security management and control system can assume that user accounts with the same user name or originating with the same IP address or Media Access Control (MAC) address should be linked.

In some examples, the behavioral analytics engine 304 can include contextual data in the activity profile for a user. Contextual data can be obtained, for example, from third-party data 318, where the source of the third-party data 318 is a reputation system, a social media system, a news aggregator or provider, or another system that can maintain information about a user. Examples of contextual data include, travel location and itinerary from travel applications or email, employee status from healthcare management systems, sensitive financial time period from a Salesforce application, and/or sensitive emails from email servers, among other data. In some examples, contextual data can additionally or alternatively be obtained from client devices used by the user. In these examples the contextual data can include, for example, identification of a type of the client device, IP addresses used by the client device, geolocation data computed by a Global Positioning System (GPS) receiver of the client device, and other information about the client device or that can be obtained from the client device.

In various examples, activity profiles can cover different time periods. In some examples, activity profiles can use a fixed moving window covering a time period measured in weeks. In some examples, an "emerging profile" can be generated, which capture events that are relatively recent, such as within the last week or within a week prior to a target date. In some examples, a "stable profile" can be generated, which includes events within the last four (or eight) weeks or within four (or eight) weeks prior to a target date. In various examples, other profiles or profile types can be generated.

In some examples, fixed moving windows can be non-overlapping. That is, a window that goes further back in time can exclude events in a window that is more recent in time. For example, an eight week profile does not include events in a four week profile or one week profile and similarly the four week profile does not include events within the one week profile. Daily (or periodic) aggregation processes may be run intra-day or inter-day.

Table 3 below shows example calculated statistics for some user activities. The example user activities include an average login count for a four week window profile ("avglogcntday4wk"), an average login IP address count for a four week window profile ("avglogipcntday42k"), a standard deviation of login count for a one week window profile ("stdlogcntday1wk"), and a standard deviation of login IP address count for a one week window profile ("stdlogipcntday1wk"). Similar and other statistics can be calculated, depending on the available data and/or the threat being predicted.

TABLE 3

| User ID | avglogcntday_4wk | avglogipcntday_4wk | stdlogcntday_1wk | stdlogipcntday_1wk |
|---|---|---|---|---|
| User 1 | 5 | 4 | 3 | 2 |
| User 2 | 6 | 2 | 2 | 1 |
| User 3 | 4 | 3 | 2 | 2 |
| User 4 | 4 | 4 | 2 | 1 |
| User 5 | 5 | 5 | 1 | 1 |

Statistics such as those illustrated above can be combined into a feature vector. Feature vectors can include, for example, a count of a number of logins, a count of a number of distinct IP addresses used for logging in, a maximum distance between any two IP addresses used to log in within a 24-hour time period, a count of a number of distinct browsers used in connections to the cloud application within a 24 hour time period, and/or other measures. Feature vectors may be aggregated per cloud application and/or per user per cloud application.

Table 4 below shows example daily aggregation matrix vectors. The first column provides example application providers, the second column illustrates vector dimensions that may be supported by the providers, and the third column illustrates values that can be assigned to each dimension.

TABLE 4

| Application | Dimension | Description |
|---|---|---|
| Amazon, Salesforce, Box | Login | (# of count, Avg, Stddev, Max) |
| Amazon, Salesforce, Box | Failed Login | (# of count, Avg, Stddev, Max) |
| Amazon, Salesforce, Box | Login IP | (# of count, Avg, Stddev, Max) |
| Amazon, Salesforce, Box | Failed Login IP | (# of count, Avg, Stddev, Max) |
| Box | Download | (# of count, Avg, Stddev, Max) |
| Box | Download IP | (# of count, Avg, Stddev, Max) |
| Salesforce | Browsers | (# of count, Avg, Stddev, Max) |
| Salesforce | Mass Delete, Mass Transfer, Data Export | (# of count, Avg, Stddev, Max) |
| Salesforce | Certificate and Key Management | (# of count, Avg, Stddev, Max) |

TABLE 4-continued

| Application | Dimension | Description |
|---|---|---|
| Salesforce | Network Access and IP Whitelist Changes | (# of count, Avg, Stddev, Max) |
| Salesforce | Manage User Changes | (# of count, Avg, Stddev, Max) |
| Salesforce | Platforms | (# of count, Avg, Stddev, Max) |
| Salesforce | Password Policy Changes | (# of count, Avg, Stddev, Max) |
| Salesforce | Shared Setting Changes | (# of count, Avg, Stddev, Max) |
| Amazon | EC2 Instance Changes | (# of count, Avg, Stddev, Max) |
| Amazon | Security Group Changes | (# of count, Avg, Stddev, Max) |
| Amazon | SSH Key Pair Changes | (# of count, Avg, Stddev, Max) |
| Amazon | Network ACL Changes | (# of count, Avg, Stddev, Max) |
| Amazon | VPN Connection Changes | (# of count, Avg, Stddev, Max) |
| Amazon | SAML Changes | (# of count, Avg, Stddev, Max) |
| Amazon | VPC Changes | (# of count, Avg, Stddev, Max) |
| Amazon | IAM Access Key Changes | (# of count, Avg, Stddev, Max) |

Table 5 below lists example values for several possible daily aggregation matrix vectors. The example vectors illustrated here include a count of logins per day for one day ("logcntday_1dy"), a count of failed logins per day for one day ("logfailcntday_1dy"), a count per day of IP addresses from which failed logins occurred over one day ("logfailipdisday_1dy"), and a count per day of IP addresses used to log in over one day ("logipdisday_1dy").

TABLE 5

| User ID | logcntday_1dy | logfailcntday_1dy | logfailipdisday_1dy | logipdisday_1dy |
|---|---|---|---|---|
| User1 | 5 | 4 | 3 | 2 |
| User2 | 6 | 2 | 2 | 1 |
| User3 | 4 | 3 | 2 | 2 |
| User4 | 4 | 4 | 2 | 1 |
| User5 | 5 | 5 | 1 | 1 |

In various examples, activity profiles determined by the behavioral analytics engine 304 can be used by the threat detection engine 302 to identify usage of a cloud service that may pose a threat to an organization that is using the cloud service. In some examples, the threat detection engine 302 applies security policies to identify a threat. A security policy can describe an event that, when the event occurs, the event is brought to the attention of the organization and/or the security management and control system. For example, security policies can specify actions, such as downloading a file containing credit card numbers, copying encryption keys, elevating privileges of a normal user, and so on, that need to be brought to the attention of the organization. In some examples, a security policy can also describe an action that is to be taken when an event is detected, such as blocking access to a service, or disabling a user account.

In some examples, the threat detection engine 302 conducts anomaly detection to identify a threat. Anomaly detection can involve searching for statistical variations from an established norm. In some examples, the operations of the threat detection engine 302 can be augmented by a tenant base line 317, which can include threat intelligence from the organization. In some examples, the threat detection engine 302 can alternatively or additionally receive threat intelligence data 314 that is maintained by the security management and control system, and/or third-party data 318 that includes threat intelligence from, for example, threat intelligence aggregators or distributors.

Provided below are various example algorithms that can be used for anomaly detection. These algorithms are provided as examples, and other algorithms can be used.

Algorithm 1 is one example of an algorithm that can be used to determine login IP address variations. Z-scores can be calculated for a login IP address feature vector over different time periods. The example that follows uses one week, four weeks, and eight weeks as examples of time different time periods, resulting in three Z-scores:

$$L1\ ZScore = \frac{\text{Login } IP \text{ past 24 hrs} - 1 \text{ wk Avg Login } IP}{1 \text{ Wk } Stddev \text{ Login } IP}$$

$$L2\ ZScore = \frac{\text{Login } IP \text{ past 24 hrs} - 4 \text{ wk Avg Login } IP}{4 \text{ Wk } Stddev \text{ Login } IP}$$

$$L3\ ZScore = \frac{\text{Login } IP \text{ past 24 hrs} - 8 \text{ wk Avg Login } IP}{8 \text{ Wk } Stddev \text{ Login } IP}$$

The Z-scores may be combined with weights (w1 ... w3) assigned to each score, as follows:

$$L\ Combine = (w1 \times L1\ ZScore) + (w2 \times L2\ ZScore) + (w3 \times L3\ ZScore)$$

In some examples, the sum of the weights is one. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weights can be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

Algorithm 2 is an example of an algorithm that can be used to detect failed login IP address variations. Z-Scores may be calculated for a login IP address feature vector over different time periods, here illustrated as one week, four weeks, and eight weeks, as an example:

$$L1\ ZScore = \frac{\text{Failed Login } IP \text{ past 24 hrs} - 1 \text{ wk Avg Failed Login } IP}{1 \text{ Wk } Stddev \text{ Failed Login } IP}$$

$$L2\ ZScore = \frac{\text{Failed Login } IP \text{ past 24 hrs} - 4 \text{ wk Avg Failed Login } IP}{4 \text{ Wk } Stddev \text{ Failed Login } IP}$$

$$L3\ ZScore = \frac{\text{Failed Login } IP \text{ past 24 hrs} - 8 \text{ wk Avg Failed Login } IP}{8 \text{ Wk } Stddev \text{ Failed Login } IP}$$

The Z-scores for the failed login IP addresses may be combined with weights (w1 ... w3) assigned to each score, as follows:

$$L\ \text{Combine} = (w1 \times L1\ ZScore) + (w2 \times L2\ ZScore) + (w3 \times L3\ ZScore)$$

In various examples, weights that are applied may be calculated dynamically depending on when the calculation is performed. For example, at day one, default baselines may be applied using values calculated based on existing data, including a default Avg (average) and default Stddev (standard deviation). In this example, the weights can be varied as the weeks progress, as provided in the example of Algorithm 1. An anomaly condition in the variation in login IP addresses may be defined as L Combined>T where T is a threshold. The threshold can be determined from previous data and/or can be modified over time.

In various examples, anomalous activity that is detected for a user of one cloud service can be used by the threat detection engine 302 to calculate or re-calculate the likelihood of a threat in the use of another cloud service. In this way, new events occurring during the use of one cloud service can be screened proactively to detect and/or predict threats in the use of another cloud service. In various examples, multiple data points across different cloud services can be correlated to increase the accuracy of a threat score.

Algorithm 3 provides an example of an algorithm that can be used for analytics of multiple application behavior. In algorithm 3, user IP addresses associated with various cloud service activities (such as logging in) are resolved to geolocation coordinates IP1 (Latitude 1, Longitude 1), IP2 (Latitude 2, Longitude 2), IP3 (Latitude 3, Longitude 3), etc. If a user has different usernames with different cloud services, the various usernames associated with that user can be mapped to a unique user specific identity that identifies the user across the services. The distance between any two IP addresses used for logins (e.g., login attempts, successful logins, and/or failed logins) with any of a number of cloud service (e.g., Amazon Web Services, Box, Salesforce, etc.) can be calculated using any of a variety of distance measurements and/or formulas. In some examples, the distance d is calculated using the Haversine Distance formula, as follows:

$$Diff_{Long} = \text{Longitude2} - \text{Longitude1}$$

$$Diff_{Latitude} = \text{Latitude2} - \text{Latitude1}$$

$$a = \left(\sin\left(\frac{Diff_{Latitude}}{2}\right)\right)^2 + \left(\cos(\text{Latitude1}) \times \cos(\text{Latitude2}) \times \left(\sin\left(\frac{Diff_{Long}}{2}\right)\right)^2\right)$$

$$c = 2 \times a\tan2(\sqrt{a}, \sqrt{1-a})$$

$$d = R \times c$$

In the equation for d, R is the radius of the Earth.

Z-Scores can be calculated to determine deviation of user behavior over different time periods using maximum distances as calculated above. As an example, time periods of 1 week, 4 weeks, and 8 weeks are shown:

$$L1\ ZScore = \frac{\text{Max } dist \text{ } IP \text{ Login past 24 hrs} - 1 \text{ wk Avg (Max } dist \text{ } IP \text{ Login per day)}}{1 \text{ Wk } Stddev \text{ (Max } dist \text{ between } IP \text{ Login per day)}}$$

$$L2\ ZScore = \frac{\text{Max } dist \text{ } IP \text{ Login past 24 hrs} - 4 \text{ wk Avg (Max } dist \text{ } IP \text{ Login per day)}}{4 \text{ Wk } Stddev \text{ (Max } dist \text{ between } IP \text{ Login per day)}}$$

$$L3\ ZScore = \frac{\text{Max } dist \text{ } IP \text{ Login past 24 hrs} - 8 \text{ wk Avg (Max } dist \text{ } IP \text{ Login per day)}}{8 \text{ Wk } Stddev \text{ (Max } dist \text{ between } IP \text{ Login per day)}}$$

The Z-scores may be combined with weights (w1 ... w3) assigned to each score, as follows:

$$L\ \text{Combine} = (w1 \times L1\ ZScore) + (w2 \times L2\ ZScore) + (w3 \times L3\ ZScore)$$

In various examples, weights that are applied may be calculated dynamically depending on when the calculation is performed. For example, at day one, default baselines may be applied using values calculated based on existing data, including a default Avg (average) and default Stddev (standard deviation). In this example, the weights can be varied as time progresses, as provided above. An anomaly condition in the variation in login IP addresses may be defined as L Combined>T where T is a threshold. The threshold can be determined from previous data and/or can be modified over time.

Algorithm 4 provides an example of an algorithm for determining variations in the browser or operating system (OS) used when a cloud application is accessed. Z-Scores may be calculated using a feature vector that represents a count of the number of different browsers or operating systems used when accessing a cloud application, where the accesses occurred over various time periods. Periods of one week, four weeks, and eight weeks are used below, as an example:

$$L1\ ZScore = \frac{\{\text{Browser}, OS\} \text{ counts past 24 hrs} - 1 \text{ Wk Avg} (\{\text{Browser}, OS\}\text{counts per day})}{1 \text{ Wk } Stddev \text{ } (\{\text{Browser}, OS\}\text{counts per day})}$$

-continued $$L2\ ZScore = \frac{\{Browser, OS\} \text{ counts past 24 hrs} - 4\ Wk\ Avg\ (\{Browser, OS\}\text{counts per day})}{4\ Wk\ Stddev\ (\{Browser, OS\}\text{counts per day})}$$

$$L3\ ZScore = \frac{\{Browser, OS\} \text{ counts past 24 hrs} - 8\ Wk\ Avg\ (\{Browser, OS\}\text{counts per day})}{8\ Wk\ Stddev\ (\{Browser, OS\}\text{counts per day})}$$

The Z-scores may be combined with weights (w1 . . . w3) assigned to each score, as follows:

$$L\ Combine = (w1 \times L1\ ZScore) + (w2 \times L2\ ZScore) + (w3 \times L3\ ZScore)$$

In various examples, default baselines can be initially applied, and as time progresses, the weights can be varied as more data becomes available. An anomaly condition in the variation in login IP addresses may be defined as L Combined>T where T is a threshold. The threshold can be determined from previous data and/or can be modified over time.

Algorithm 5 provides an example of an algorithm for determining variations in the number of downloads from a cloud application. Z-Scores may be calculated using a feature vector representing a count of the number of downloads for a user account over various time periods, such as one week, four weeks, and eight weeks, as provided in the following example:

$$L1\ ZScore = \frac{\text{Download counts past 24 hrs} - 1\ Wk\ Avg\ (\text{Download ounts per day})}{1\ Wk\ Stddev\ (\text{Download counts per day})}$$

$$L2\ ZScore = \frac{\text{Download counts past 24 hrs} - 4\ Wk\ Avg\ (\text{Download ounts per day})}{4\ Wk\ Stddev\ (\text{Download counts per day})}$$

$$L3\ ZScore = \frac{\text{Download counts past 24 hrs} - 8\ Wk\ Avg\ (\text{Download ounts per day})}{8\ Wk\ Stddev\ (\text{Download counts per day})}$$

The Z-scores may be combined with weights (w1 . . . w3) assigned to each score, as follows:

$$L\ Combine = (w1 \times L1\ ZScore) + (w2 \times L2\ ZScore) + (w3 \times L3\ ZScore)$$

In various examples, default baselines can be initially applied, and as time progresses, the weights can be varied as more data becomes available. An anomaly condition in the variation in login IP addresses may be defined as L Combined>T where T is a threshold. The threshold can be determined from previous data and/or can be modified over time.

In various examples, scores such as those illustrated above, as well as other indicators, can be used to compute a risk score, which is also referred to herein as a measure of security. In various examples, the threat detection engine 302 can compute a risk score for a user, a group or category of users, a service, and/or a service provider. A risk score can indicate a degree of security risk. For example, a scale from one to five can be defined, where a higher value indicates that a user or a service poses a higher security risk for an organization.

Indicators used to compute a risk score can provide a particular risk factor, also in the form of a score. For example, an outcome of anomaly detection can include an indicator in the form of a score that indicates a degree of deviation from the norm and/or a degree of risk the anomaly poses to the organization. In some examples, each anomaly associated with the same user or the same service can be used as a separate indicator. In various examples, other indicators that can be used to compute a risk score can be associated with a user, a service, a service provider, a geolocation where the user appears to be located, a domain where the user appears to be located, a time of day or day of the week or time of the year, or another factor. An indicator for a user can be obtained, for example, from the organization with which the user is associated, from a reputation site, from social media sites, from news organizations, or from another source. An indicator for a service or service provider can be obtained, for example, from threat intelligence aggregators or distributors, who may track the reputation of a service or service provider. Other indicators may be provided by internal threat intelligence data 314.

In various examples, a risk score can be computed as a weighted sum of the available indicators. For example, given indicators "$I_1, I_2, \ldots, I_n$" a risk score can be computed using the equation:

$$\text{risk score} = \frac{I_1 W_1 + I_2 W_s + \ldots + I_n W_n}{W_1 + W_2 + \ldots + W_n}$$

In the preceding equation, "$W_1, W_2, \ldots W_n$" are weights. In various examples, a weight value can indicate the relative importance of an indicator, with less important indicators receiving a lower weight value.

In some examples, the analytics engine 300 may obtain feedback on the validity and/or accuracy of a risk score. As an example, network administrators of an organization can provide feedback. As another example, adminsitrators of the security management and control system can provide feedback. Alternatively or additionally, in some examples, feedback can be obtained using autoamated machine learning algorithms, such as decision trees and neural networks. In some examples, the analytics engine 300 can adjust weights, indicators, and/or sources using the feedback, including possibly removing sources or indicators. In these and other examples, the threat detection engine 302 can compute a new risk score with the adjusted indicators and weights.

In various examples, the threat detection engine 302 can perform regression analysis on each indicator used to compute a risk score, and/or on the risk score. Regression analysis may include building and updating a linear regression model. A linear regression model may provide output such as $S=c_1(I_1)+c_2(I_2)++c_n(I_n)$. The coefficients $c_1$ computed by the regression model could be new or modified weights that would replace the initial weights for computing the risk score. The model can provide greater accuracy as more feedback and more data is collected.

In various examples, the analytics engine 300 can perform various other analytics 306 on the activity data 310 obtained from service providers. In some examples, various types of algorithms can be particularly useful for analyzing the data. Decision tree, time series, naive Bayes analysis, and techniques used to build user behavior profiles are examples of machine learning techniques that can be used to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity with one cloud application or across multiple cloud applications, possibly over time.

One class of analytics that may be generated is descriptive or statistical analytics. Statistical data can be generated using a pre-defined set of system queries, such as, for example, MapReduce jobs and Spark and Apache Hive queries, among others. Descriptive analytics can be generated either for a single service or across multiple services using correlation techniques. Examples of reports that can be generated include, for example, login statistics (e.g., users with the most failed logins, IP address-based login history including consideration of IP reputation, geolocation, and other factors), user statistics (e.g., users with the most resources [files, EC2 machines, etc.], entitlements across clouds, number of changed passwords, and so on), activity statistics (e.g., activity of a user across clouds), statistics on key rotation (e.g., whether SSH keys have been rotated within the last thirty days, and so on), and resource statistics (e.g., number of folders, files downloaded by users, files downloaded by roaming or mobile users, and so on), among others. Various statistical analysis techniques can be used, such as mean, standard deviation, regression, sample size determination, and hypothesis testing, among others. Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, for example, deviations from base line expectations, rare and infrequent events, and behavior analytics to derive suspicious behavior of a user, among others. Algorithms and profiles can be trained to intelligently predict whether an unusual behavior is a security risk. Third-party feeds from providers such as, but not limited to, MaxMind, FireEye, Qualys, Mandiant, AlienVault, and Norse STIX can be integrated to augment the threat intelligence. These third-party feeds can provide external information about and relating to potential security threats such as, for example, IP address reputation, malware, identification of infected node points, vulnerable web browser versions, use of proxy or Virtual Private Network (VPN) server by a user, and known attacks on clouds. In some examples, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file accesses, sales transactions, or instances of virtual machines.

Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In some examples, data collected over time is used to build models of normal behavior (e.g., patterns of events and activity) and flag behavior that deviates from normal as abnormal behavior. After one or more flagged events or activities is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over a period of time can be used with machine learning algorithms to generate patterns referred to as user behavior profiles. The activity data can include contextual information such as IP address and geographic location.

In various implementations, an algorithm can simulate normal user activities using previously acquired user activity data. For example, the tenant base lines 317 can include records of users' past use of a cloud service. The simulation can be used to train other machine learning algorithms to learn the normal behavior of an organization's users. In general, a particular security issue may not always repeat, and hence may not be detected by a purely supervised algorithm. However, techniques such as outlier detection can establish a baseline that is useful for detecting anomalous activities. Such anomalous activities along with contextual threat intelligence can provide more accurate prediction of threats with low prediction errors.

In various implementations, the other analytics 306 can include detection of security controls drift, which can refer to the changing of one or more security controls in a seemingly arbitrary manner, which can increase security risks. In some examples, a risk event can be generated in response to the change in a security control of a cloud service, as well as actionable intelligence associated with the risk event. Threats can include activity, events, or security controls that are abnormal or noncompliant with respect to use of an application. As an example, a tenant's password policy in a cloud application may have been changed to impose fewer requirements (e.g., type and/or number of characters). This may generate a risk event and alert to recommend that the password policy be changed back to the original password policy.

In various implementations, the analytics engine 300 can include a recommendation engine 308 that receives the output of the threat detection engine 302, the behavioral analytics engine 304, and the other analytics 306. In various examples, the recommendation engine 308 can raise alerts 322, make recommendations 324, automatically perform actions 326, and provide visualizations 328 that an organization can use to understand the organization's use of a cloud service, detected security risks, and remediation of the security risks, among other things.

In various examples, alerts 322 can be provided in visualizations 328 that can be viewed using a user interface that is accessible to an organization. Alternatively or additionally, alerts 322 can be provided through other communication channels, such as email, text messages, Short Message Service (SMS) messages, voicemail, or another communication method. In some examples, alerts 322 can be communicated as secure messages (e.g., over a secure communication channel or requiring a key or login credentials to view).

An alert can include information about a detected event such as, for example, an event identifier, a date, a time, a risk level, an event category, a user account and/or security controls associated with the event, a service associated with the event, a description of the event, a remediation type (e.g., manual or automatic), and/or an event status (e.g., open, closed) among other information. Information in an alert about each risk event can include, for example, an identifier for the affected cloud service or instance a category, a priority, a date and time, a description, a recommended remediation type, and/or a status, among other information. A risk event may also have a user-selectable action, such as editing, deleting, marking status complete, and/or performing a remediation action. Selection of a remediation action may invoke an application such as the incident remediation application and/or cloud seeder application to perform the selected remediation. An alert and/or other information concerning an identified threat can be sent to an entity external to security monitoring and control system.

In some examples, counts of events in different event categories over time can be provided as a graphical visualization, such as a chart. The chart may display, for example, a count of events by date in each of the color coded categories such as activities at an unusual time, after-hours downloads, failed logins, etc. The visual representation (e.g., a line) of an event category can be toggled on and off. In some examples, threats can also be displayed in a summary view.

In some examples, when the network administrators of an organization receive alerts 322, the network administrators may take remediation actions from within the organization's network. In these examples, the security management and control system may maintain an alert in an "open" state until the network administrators repot that the alert can be closed.

In various examples, the recommendation engine 308 can also determine recommendations 324 when the threat detection engine 302 or the other analytics 306 flag an event that requires attention. A recommendation can include, actions that can be taken to further investigate a suspicious event or to remediate (e.g., take corrective actions against) a suspicious event. In various examples, recommendations 324 can be presented to network administrators of an organization in visualizations 328, presented in a user interface. Alternatively or additionally, the recommendations 324 can be presented through other forms of communication, such as email, text messages, SMS messages, voicemails, and so on. In various examples, the network administrators of the organization can choose to activate a recommended action, which can cause the security management and control system to perform the actions.

In various examples, the recommendation engine 308 can use association rule learning can to generate recommendations. In some examples, the recommendation engine 308 can use profile linking algorithms to link activities across multiple cloud applications by finding cross-service correlation. A single user can be identified across multiple cloud service using one or more attributes or identification factors, such as a primary user identifier that is commonly used across the clouds or a single sign-on (SSO) authentication mechanism (e.g., Active Directory, Okta, etc.). Examples of correlation of activities across applications find a user logged into two cloud services simultaneously from different IP addresses, find a user who performs several failed login attempts and subsequently changes the user's password, and users who frequently have with numerous failed logins for two or more cloud services, among other examples.

In various examples, the recommendation engine 308 can also determine actions 326, including remediation actions, which the security management and control system will automatically perform. In various examples, the organization can configure to automatically perform remediation actions when the analytics engine 300 detects certain security events. Examples of remediation actions include deactivating an account, resetting a password, or setting stronger security controls, among others. In these and other examples, the remediation actions may include modifying a security setting of a service affected by the security incident, or of another service. In the latter case, the analytics engine 300 may determine that the other service may be affected, or should otherwise be secured when the security incident is detected.

In some examples, an organization may use a third-party incident management automation systems such as, for example, ServiceNow or IBM QRadar, among others. In these examples, the security management and control system may be able to interface with the third-party incident management system to remediate security incidents. For example, the incident management systems may have an API through which the security management and control system can interact with the incident management systems. In this and other examples, an action determined by the recommendation engine 308 can include sending an alert and/or other information about a security incident to an incident management system, which can track and possibly also remediate the incident. The incident management system may return a status to the security management and control system (e.g., complete or not complete). In this way, remediation may be delegated to an external system with the results reported back to the security management and control system to "close the loop." For example, if a password reset is desired for a user account, an action can include sending an alert or message to an organization's internal Information Technology (IT) system managing the user account. An administrator or system may complete the password reset operation and report the status as completed back to the cloud security system.

From time to time, the operators of the security monitoring and control system may add new features to the security monitoring and control system, such as new security analysis tools. Alternatively or additionally, the operators may add support for new service being offered by an existing or new service provider. For example, a cloud storage service may add a music or video streaming service. Alternatively or additionally, an existing service provider may make a change to an existing service, such as adding a new capability or modifying an existing capability. For example, a file sharing service that has previously allowed any file to be shared may begin restricting the types of files that can be shared.

In these and other examples, the operators of the security monitoring and control system can modify components in the system, and/or add new components. Before such changes can be made available to customers, however, the changes to the system need to be tested to ensure that the modified or new components function as desired, and that these components do not other components in an undesirable way.

Figure 4:
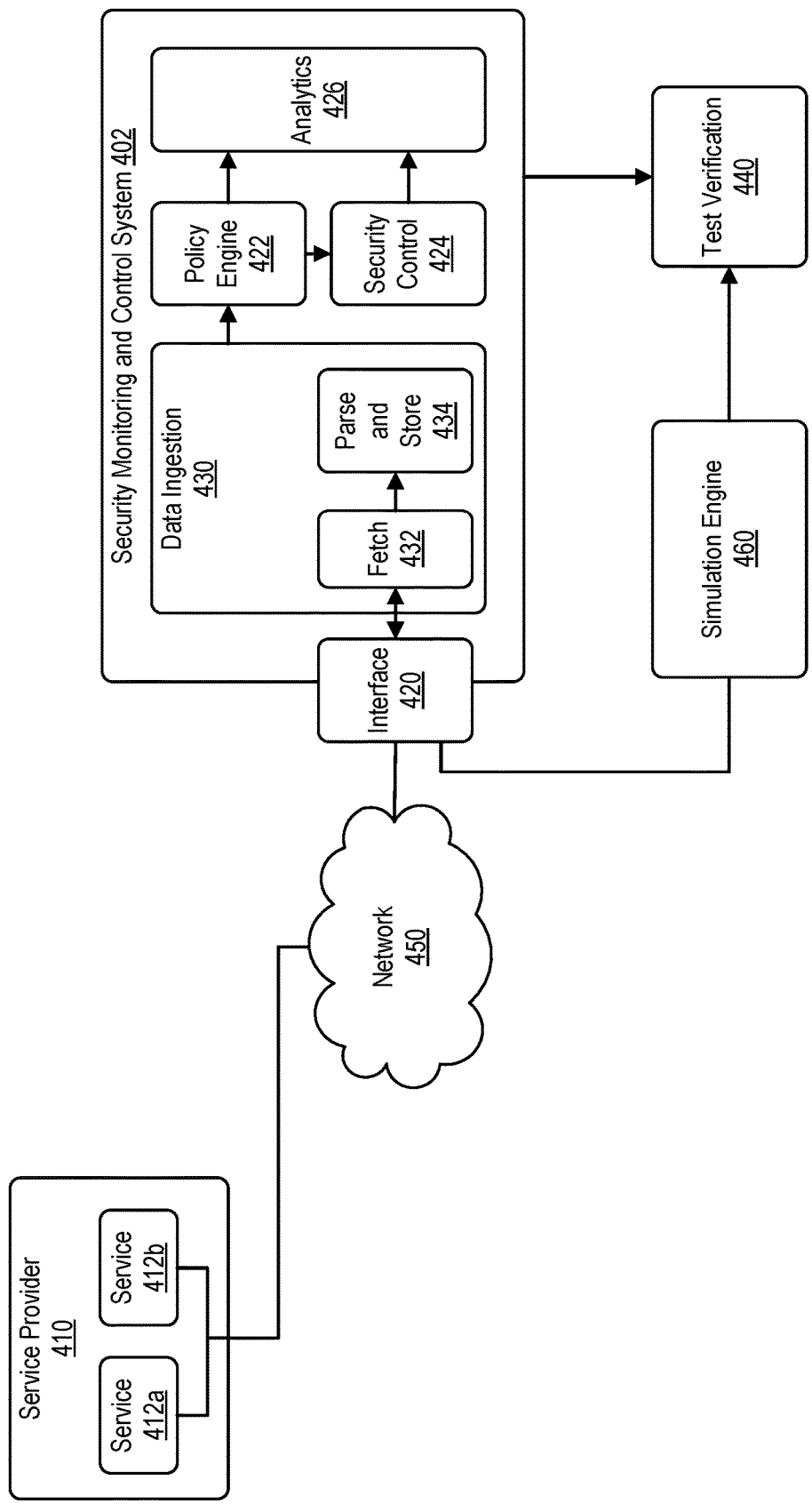
FIG. 4 includes a block diagram illustrating an example of a computing environment that includes a security monitoring and control system and a simulation engine.

FIG. 4 includes a block diagram illustrating an example of a computing environment 400 that includes a security monitoring and control system 402 and a simulation engine 460 that can assist in testing of the security monitoring and control system 402. The security monitoring and control system 402 of this example is similar to the security monitoring and control system illustrated in FIG. 1, though the components of the security monitoring and control system 402 of FIG. 4 have been simplified for ease of understanding this example.

In various examples, the security monitoring and control system 402 can provide threat analysis and remediation for organizations that use the services 412a-412b provided by a service provider 410. The users of the organizations can use the services 412a-412b over a network 450 or a combination of networks, which can include an enterprise network of an organization, a private network in a user's home, public networks in places such as libraries or coffee shops, and/or the public Internet, among other examples. In these and other examples, the security monitoring and control system 402 can attempt to ensure that users' use of the services 412a-412b does not pose a security risk to the users or any organization with which the users are associated. In various examples, the security monitoring and control system 402 is similarly a cloud service that is provided to organizations and/or to users over a network 450.

In the example of FIG. 4, a subset of the components of the security monitoring and control system 402 are illustrated. These components include an interface 420 to the network 450, a data ingestion 430 component, a policy engine 422, a security control 424, and an analytics 426 component.

In various examples, the interface 420 includes software and hardware that enables the security monitoring and control system 402 to communicate with customers and with service providers. The interface 420 can, for example, provide physical network connections and network protocol stacks for managing network communications. In some examples, the interface 420 can further include software components for establishing secure connections with the service provider 410 and/or customers, and tools for exchanging data with the service provider 410 and/or with customers.

As discussed above, in various examples, the security monitoring and control system 402 processes activity data obtained from service providers, such as the example service provider 410 illustrated in FIG. 4, to determine whether users' use of the service provider's services constitute possible security risks. Processing the activity data can, first, involve obtaining activity logs from the service provider 410 and storing the activity logs in a common format. Activity data from different service providers and/or services can be in different formats (e.g., one service provider may provide the activity data in a comma-separated-value format while another provides activity data in a JSON or XML format). Initial processing can thus translate the different formats into a common format that can be used internal to the security monitoring and control system 402.

To accomplish this initial processing, the security monitoring and control system 402 can use the data ingestion 430 component. The data ingestion 430 component can include software executing on a server computer and/or data stores in the form of memory or storage drives. In some examples, the data ingestion 430 is a component of the interface 420.

In various examples, the security monitoring and control system 402 can include a fetch 432 component and a parse and store 434 component.

In various examples, fetch 432 can interact with the service provider 410 to obtain or receive activity logs. In some examples, the fetch 432 initiates a connection with the service provider 410, and requests activity logs for one or multiple services provided by the service provider 410. In these examples, the fetch 432 can obtain activity logs periodically, such as once per hour, once per day, or over another timer interval. In some examples, the service provider 410 periodically generates and sends activity logs for one or more of the services provided by the service provider 410. In these examples, the fetch 432 is configured to receive the activity. In various examples, the fetch 432 is a software component or a combination of software components that is in communication with the network hardware of the interface 420.

In various examples, the parse and store 434 component is able to parse an activity log from the service provider 410, where parsing includes reading the data in the activity log and identifying the data. Identifying the data can include determining individual actions recorded in the activity log and the parameters or fields associated with each action. In various examples, an action can represent one or a combination of steps performed by a user in using one of the service provider's services 412a-412b. Herein, an action can also be referred to as an event.

In various examples, output of parsing the activity log can include data structures that store the data from the activity log in a structure format. The data structures can be output in text or binary files, for example, and be stored by the parse and store 434 in a data store or other data storage system.

From the data store, the security monitoring and control system 402 can provide the commonly structured activity data to security monitoring tools, including the policy engine 422. In various examples, the policy engine 422 can determine whether any security policy has been violated, as discussed above. Other security monitoring tools can include a behavioral analysis engine (not illustrated here) among others.

Output from the policy engine 422 and other security monitoring tools can be provided to the security control 424, which can determine any actions that need to be taken in response to a security violation. For example the security control 424 can disable a user's access to the service provider 410.

Output from the policy engine 422 and/or the security control 424 can be provided to various analytics 426 tools. The analytics 426 tools can conduct analysis on policy violations and/or lack of policy violations, behavioral anomalies, and/or security control actions, among other outputs, to identify new or existing security threats, to build profiles of user or organizational behavior, to generate usage statistics, and/or to generate usage or threat reports, among other activities.

As noted above, at various times, components of the security monitoring and control system 402 may be changed. For example, the service provider 410 may be a new service provider, and/or may be providing service that the security monitoring and control system 402 has not previously monitored. In this example, the fetch 432 component may need to be modified to support the service provider's interface. Also in this example, the parse and store 434 may need to be updated to be able to read the activity logs from the service provider 410. As another example, the operators of the security monitoring and control system 402 may improve upon the features of the policy engine 422, the security control 424, and/or the analytics 426, or add new tools or features. These improvements may provide customers with new monitoring and/or security control capabilities, for example.

In the preceding examples as well as in other examples, changes to the security monitoring and control system 402 should be thoroughly tested before the modifications are made available to customers. Testing ensures that the changes operate as intended (e.g., the changes do not have bugs) and that the changes do not interfere with the operation of components that have not been changed.

To test the security monitoring and control system 402, in various examples, the environment 400 can include a simulation engine 460. As discussed further below, the simulation engine 460 can generate activity logs that are similar to the activity logs that come from a specific service provider 410. Being similar to the activity logs from the service provider 410 means that the activity logs generated by the simulation engine 460 have the same format or organize data in the same way as the activity logs from the service provider 410. The simulated activity logs, however, can include data that focus on a test scenario, so that a specific function of the security monitoring and control system 402 can be targeted and tested. Additionally, the simulated activity logs can include large volumes of data, in order to target many test scenarios, simulate realistic workloads, and/or to stress test the system.

In various examples, the simulation engine 460 an also output activity logs in the same way as the service provider 410. For example, the simulation engine 460 can mimic the API of the service provider 410, so that the fetch 432 component need not be changed to obtain simulated activity data. As another example, the simulation engine 460 can push data to the security monitoring and control system 402 using the functionality of the interface 420. In these and other examples, testing the security monitoring and control system 402 can be enabled by selecting the simulation engine 460 as an activity log source instead of the service provider 410. The selection can be controlled, for example, at the interface 420. Configuring the security monitoring and control system 402 to obtain data from the simulation engine 460 can be referred to as putting the security monitoring and control system 402 in a test mode. In some examples, the security monitoring and control system 402 can be configured to ingest simulated activity data from the simulation engine 460 awhile at the same time ingesting actual activity data from the service provider 410.

Other than changing the source of the activity logs, the security monitoring and control system 402 does not otherwise operate different in test mode than when not in test mode, since simulated activity logs are formatted no differently than an actual activity log from the service provider 410. The simulation engine 460 thus enables the security monitoring and control system 402 to be tested in realistic conditions, which ensures better testing.

In various examples, to determine whether the security monitoring and control system 402 responded to simulated activity data as expected, the environment 400 can include a test verification 440 component. In various examples, the test verification 440 can receive expected outcomes from the simulation engine 460 and output from the security monitoring and control system 402, and can compare the output from the security monitoring and control system 402 to the expected results to determine whether the security monitoring and control system 402 responded correctly to the simulated activity data. The expected results from the simulation engine 460 can, for example, include a simulated activity log, which the test verification 440 can read and determine the scenario being tested and the expected behavior of the security monitoring and control system 402. As another example, the expected results can be in the form of a data structure that describes a security policy that should have been triggered, an anomaly that should have been detected, a security control that should have been generated, and/or the expected contents of reports that the analytics 426 generates. Output from the security monitoring and control system 402 can similarly include structured data that indicates security policies that were triggered, anomalies detected, security controls generated, the contents of reports. Alternatively or additionally, the test verification 440 component can use only reports generated by the analytics 426 component to determine the behavior of the security monitoring and control system 402 in response to simulated activity data.

In various examples, the test verification 440 can also check for and respond to errors output by the security monitoring and control system 402 in response to simulated activity data. Errors can occur when, for example, a component of the security monitoring and control system 402 is not able to process the simulated activity data, or has been erroneously implemented. IN these and other examples, the test verification 440 can indicate to the security monitoring and control system 402 the component that has malfunctioned, and the security monitoring and control system 402 can reset or disable the component.

Figure 5:
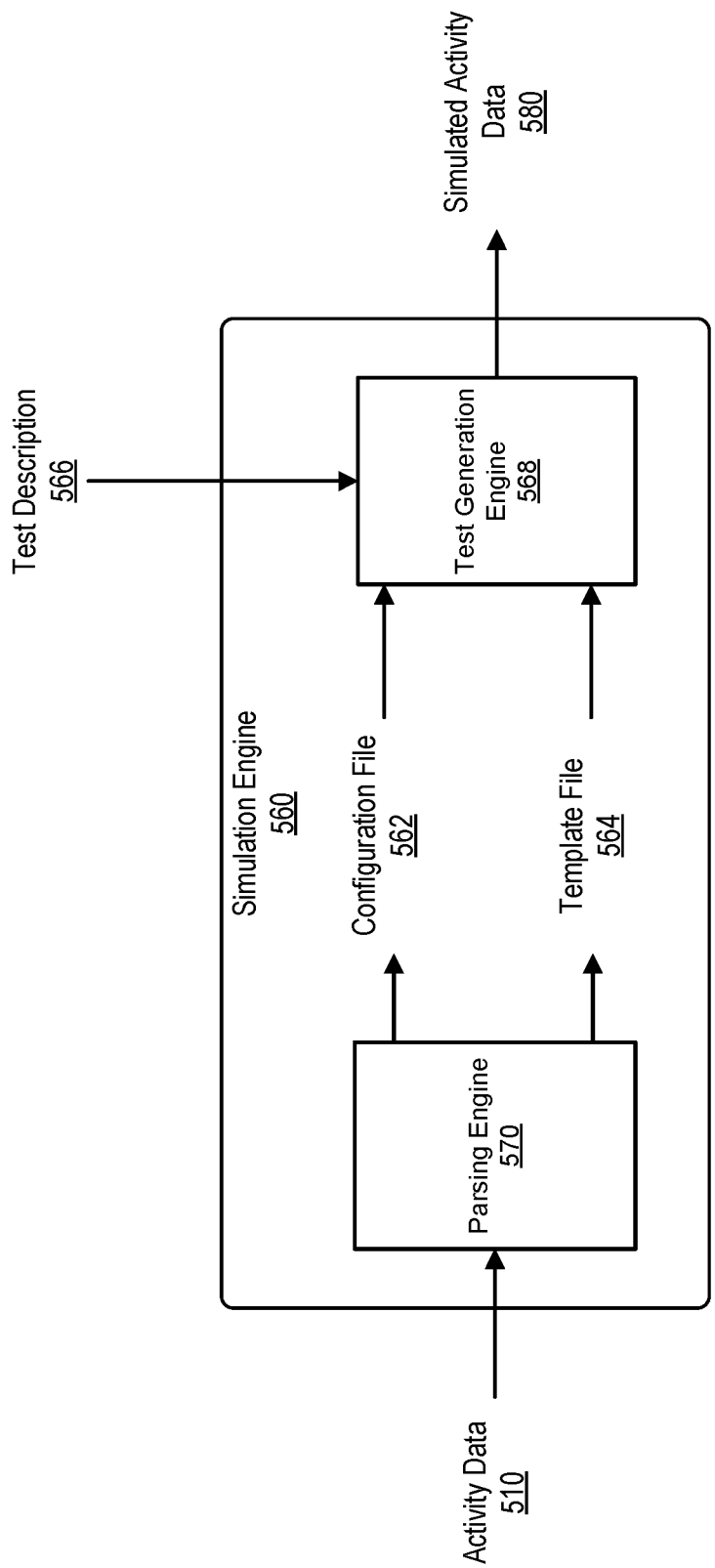
FIG. 5 includes a block diagram that illustrates in greater detail a simulation engine for testing the security monitoring and control system.

FIG. 5 includes a block diagram that illustrates in greater detail a simulation engine 560 for testing the security monitoring and control system. The simulation engine 560 can be implemented, for example, using program instructions that can executed by the processors of a server computer. In some examples, the simulation engine 560 can be a standalone component. In some examples, the simulation engine 560 can be a component that is integrated into the security monitoring and control system.

In various examples, the simulation engine 560 receives as input activity data 510, in the form of an actual activity log from a service provider. The activity log can be input as received from the service provider, or can be edited to include a subset of the events found in the log. The activity data 510 may include some or all of the possible actions that can be taken when using a particular service. In some examples, additional activity data from the service provider can be input into the simulation engine 560, so that the simulation engine 560 can learn actions that were not present in previous activity data.

The following is an example of three actions that may be found in the activity data 510. In this example, the activity data 510 is formatted as comma-separated-values, which means that the fields in each action are separated by commas. In other examples, the activity data 510 can be provided in a different structured format, such as XML or JSON, among other examples.

automationpalerra+sfuser9gmail.com,"5/13/2018 11:21 PM",160.34.88.55,Application,Success,Firefox 51,Mac OSX,Browser,N/A,N/A,N/A,login.salesforce.com,TLS 1.2, ECDHE-RSA-AES256-GCM-SHA384,US,United States, Calif.,Redwood City,94065,37.5331,-122.2471 automationpalerra+sfuser10gmail.com,"5/13/2018 11:21 PM", 52.55.40.3,Remote Access 2.0,Failure,Chrome 100, Unknown,Oracle CASB QA,N/A,N/A,N/A, login.salesforce.com,TLS 1.2,ECDHE-RSA-AES256-GCM-SHA384,US,United States,Va.,Ashburn,20149, 39.0481,-77.4728 automationpalerra+sfuser11gmail.com,"5/

13/2018 11:21 PM",52.55.40.2,Remote Access 2.0,Success, Safari 200,Unknown,Oracle CASB QA,N/A,N/A,N/A,login.salesforce.com,TLS 1.2,ECDHE-RSA-AES256-GCM-SHA384,US,United States,Va.,Ashburn,20149,39.0481,-77.4728

The example actions above each include 21 fields that provide various information about the actions. For example, the value "automationpalerra+sfuser9gmail.com" in the first action is a user name, and the value "5/13/2018 11:21 PM" is a timestamp for when the action occurred. As another example, the value "160.34.88.55" is an IP address associated with the user, "Application" describes the action taken, and "login.salesforce.com" describes a resource on which the action was taken. Various other information is also available from the fields in each action.

In various examples, the simulation engine 560 inputs the activity data 510 into a parsing engine 570. As discussed further below, the parsing engine 570 can identify the fields that make up an action, including, for example, determining a type for each field and determining a range or set of values that the field can have. In various examples, the parsing engine 570 can also determine the structure of the activity data 510, including an order of the fields for each action and an outputformat (e.g., comma-separated-values, JSON, XML, etc.) to use to generate simulated activity data 580.

In various examples, the parsing engine 570 can generate two outputs: a configuration file 562 and a template file 564.

The configuration file 562 can be used to generate simulated activity data 580 for a particular test scenario. The configuration file 562 can include, for example, a description of a test scenario and a reference to the template file 564. The following is an example of contents of a configuration file 560 can be built. The data source section includes a reference to a template file 564 ("SFDC_LoginHistory_template.json"), which can define actions to include in the simulated activity data 580 and a format for the actions. The data source section also includes a reference to a test description 566 ("SFDC_LoginHistory_data.csv") that can provide guidance for randomizing the content of the actions.

In this example, the configuration file 562 references the template file 564 that is generated when the configuration file 562 is generated. In other examples, the configuration file 562 can reference one or more previously generated template files, and/or multiple template files. In some examples, the configuration file 562 can specify more than one test description for a template file. In these examples, test generation engine 568 can use all of the test descriptions and/or can randomly select a test description from among the multiple test descriptions.

In some examples, the parsing engine 570 can output the configuration file 562 as a data structure in binary code, which can be passed to the test generation engine 568 through a function call or a similar mechanism. Output to a file, however, enables the configuration file 562 to be reused without needing to run the parsing engine 570.

As noted above, the template file 564 can encode the actions found in the activity data 510 and a structure or format of the activity data 510. The following is an example of contents of the template file 564.

```
{
  "name": "",
  "record-templates": [
```

```
{
  "simulation-scenarios": [
    {
      "name": "MySimulatedSFDCApp",
      "description": "App instance for CAS test automation",
      "app-metadata": {
        "type": "SFDC",
        "instance-name": "MySimulatedSFDCApp",
        "security-control-type": "monitoring"
      },
      "data-sources": [
        {
          "name": "LoginHistory",
          "type": "TEMPLATE",
          "repeat": 1,
          "template-file": "SFDC/SFDC_LoginHistory_template.json",
          "scenario-data-files": {
            "0": "SFDC/SFDC_LoginHistory_data.csv"
          },
          "producer": {
            "type": "webapi"
          }
        }
      ],
      "datasets": [ ]
    }
  ]
}
```

In the above example, the configuration data is formatted in a JSON data structure, which can be parsed by other software applications. In other examples, the configuration data can be output in a different format, such as XML, C++ objects, or Java objects, among other examples.

In the above example, the configuration data includes a description of a test ("App instance for CAS test automation") and data sources, from which the simulation engine -continued

```
{
  "name": "LoginHistory",
  "active": true,
  "fields": [
    {
```

```
    "name": "event_actor",
    "type": "string",
    "required": true,
    "return_value": false,
    "source": {
        "type": "file",
        "detail": "1"
    },
    "replace": [
        "$/event_actor"
    ]
},
{
    "name": "event_time",
    "type": "string",
    "required": true,
    "return_value": false,
    "source": {
        "type": "file",
        "detail": "2"
    },
    "replace": [
        "$/event_time"
    ]
},
{
    "name": "event_ip",
    "type": "string",
    "required": true,
    "return_value": false,
    "source": {
        "type": "file",
        "detail": "3"
    },
    "replace": [
        "$/event_ip"
    ]
},
{
    "name": "event_action",
    "type": "string",
    "required": true,
    "return_value": false,
    "source": {
        "type": "file",
        "detail": "4"
    },
    "replace": [
        "$/event_action"
    ]
},
{
    "name": "user_agent",
    "type": "string",
    "required": true,
    "return_value": false,
    "source": {
        "type": "file",
        "detail": "5"
    },
    "replace": [
        "$/user_agent"
    ]
}
],
"structure": {
    "structure": {
        "Field4": "N/A",
        "Field5": "N/A",
        "event_action": "Success",
        "Field2": "Mac OSX",
        "Field3": "Browser",
        "Field8": "TLS 1.2",
        "Field9": "ECDHE-RSA-AES256-GCM-SHA384",
        "Field6": "N/A",
        "Field7": "login.salesforce.com",
        "Field11": "United States",
        "Field12": "California",
        "event_actor": "automationpalerra+sfuser9gmail.com",
        "Field10": "US",
        "Field15": "37.5331",
        "Field1": "Application",
        "Field16": "-122.2471",
        "event-time": "\"5/13/2018 11:21 PM\"",
        "user_agent": "Firefox 51",
        "Field13": "Redwood City",
        "event_ip": "160.34.88.55",
        "Field14": "94065"
    }
}
}
],
"output": {
    "type": "API",
    "format": "csv",
    "separator": ",",
    "header": true,
    "page-size": 100,
    "page-count": 100,
    "replace": "$/records",
    "page-structure": {
        "structure": {
            "totalSize": "record.count",
            "records": "[ ]",
            "done": true
        }
    }
}
}
```

In the above example, the template data is formatted in a JSON data structure. In other examples, the template data can be output using a different format.

In the above example of a template file, one action, "LoginHistory," is illustrated, with the data structure called "structure" indicates the fields the parsing engine 570 found for the action. As illustrated by this example, the parsing engine 570 can automatically identify a name for each field, or else assigns a generic name to a field. In various examples, the name of the field can indicate an operation of the field within the action. For example, the name "event_actor" can describe the user who performed the action, and "event action" can describe whether the action was successful. In various examples, fields that have not been identified here can be identified later, when more information is available about the content of the field.

Also illustrated in the above example, the template file 564 can include additional information for the fields that were identified. For example, for the five fields "event_actor," "event_time," "event_ip," "event_action," and "user_agent," a data type is also provided, as well as whether the field is required to be output. As a further example, the template file 564 can describe an operation that is to occur for a field when the simulated activity data 580 is generated. In this example, the value for the field is replaced with a randomized value. In other examples, a fixed value for the field can be specified, or another operation can be specified.

The example template file 564 above also illustrates a structure that defines the output format. In this example, the outputformat will be a comma-separate-value file, similar to the format of the input activity log.

In the example of FIG. 5, the parsing engine 570 outputs the template data to a file. In other examples, the parsing engine 570 can output the template data as a data structure in object code, which can be provided to the test generation engine 568 through a function call or a similar mechanism. Output to a file, however, enables the template file 564 to be used without needing to run the parsing engine 570. Additionally, the template file 564 can be used with different configuration files.

In various examples, the simulation engine 560 can input the configuration file 562 and the template file 564 to a test generation engine 568, which can output simulated activity data 580. Generating the simulated activity data 580 can include using the configuration file 562 to determine the actions to generate, using the template file 564 to determine a format for the actions, and outputting the generated actions to a simulated activity log.

In various examples, the test generation engine 568 can also receive test description 566, which can describe parameters for the actions. For example, the test description 566 can include ranges of values within the test generation engine 568 can selection a random value for a field. As another example, the test description 566 can provide a list of values to use in different actions. As another example, the test description 566 can include fixed values to use in different actions. As another example, the test description 566 can define an outputformat for certain fields. In various examples, the contents of the test description 566 can be defined by a test writer, and/or can be randomly generated.

The following is an example of a test description 566, here provided as comma-separated-values. In other examples, the test description can be provided in a different format, such as JSON or XML.

LoginHistory,automationpalerra+sfuser9gmail.com,date('-26_min',output_format='MM/dd/yyyy HH:mm aa'), 160.34.88.55,Success,Safari 200

LoginHistory, automationpalerra+sfuser10gmail.com, date('-14_min',output_format='MM/dd/yyyy HH:mm aa'), 52.55.40.2,Success,Firefox 51

LoginHistory, automationpalerra+sfuser10gmail.com, date('-4_min',output_format='MM/dd/yyyy HH:mm aa'), 52.55.40.3,Failure,Firefox 51

LoginHistory, automationpalerra+sfuser10gmail.com, date('-29_min',outputformat='MM/dd/yyyy HH:mm aa'), 160.34.88.55,Failure,Chrome 100

LoginHistory, automationpalerra+sfuser10gmail.com, date('-13_min',outputformat='MM/dd/yyyy HH:mm aa'), 52.55.40.3,Success,Chrome 100

LoginHistory,automationpalerra+sfuser11gmail.com,date('-8_min',outputformat='MM/dd/yyyy HH:mm aa'), 52.55.40.3,Success,Firefox 51

LoginHistory,automationpalerra+sfuser9gmail.com,date('-1_min',outputformat='MM/dd/yyyy HH:mm aa'), 160.34.88.55,Failure,Firefox 51

LoginHistory, automationpalerra+sfuser10gmail.com, date('-10_min',outputformat='MM/dd/yyyy HH:mm aa'), 52.55.40.3,Success,Safari 200

LoginHistory,automationpalerra+sfuser9gmail.com,date('-10_min',outputformat='MM/dd/yyyy HH:mm aa'), 52.55.40.3,Failure,Safari 200

LoginHistory,automationpalerra+sfuser9gmail.com,date('-5_min',outputformat='MM/dd/yyyy HH:mm aa'), 160.34.88.55,Success,Safari 200

In the preceding example, each entry can provide parameters for an action that is to be generated for the simulated activity data 580. In this example, each entry includes a field identifying an action ("LoginHistory") for which the entry provides parameters. The parameters in this example include a randomized user name and a timestamp, where the timestamp is given as a relative value. The relative value of the timestamp parameter enables a generated action to have a recent timestamp, which provides more realistic data. The entries in the test description 566 also include a format for the timestamp, a randomized IP address, a randomized outcome, and a randomized user agent (e.g., an application used by the user in performing the action). In some examples, specific IP addresses, outcomes, and/or user agents can be specified, to test specific scenarios. In other examples, one or more of these fields can be randomized. Randomization can create many more test scenarios than a human test writing can generate. Randomization can, for example, find corner case bugs and create stress test scenarios.

In various examples, different test descriptions can be input with the same configuration file 562 and template file 564 to produce different simulated activity data 580. As noted above, the configuration file 562 can specify multiple test descriptions, and the test generation engine 568 can be configured to use all the specified test descriptions for one simulated activity log, to generate a simulated activity log for each test description, and/or to randomly select a test description to generate the activity log.

As discussed above, the simulated activity data 580 generated by the simulation engine 560 can be input into the security monitoring and control system in the same way as activity data from an actual service provider.

Figure 6:
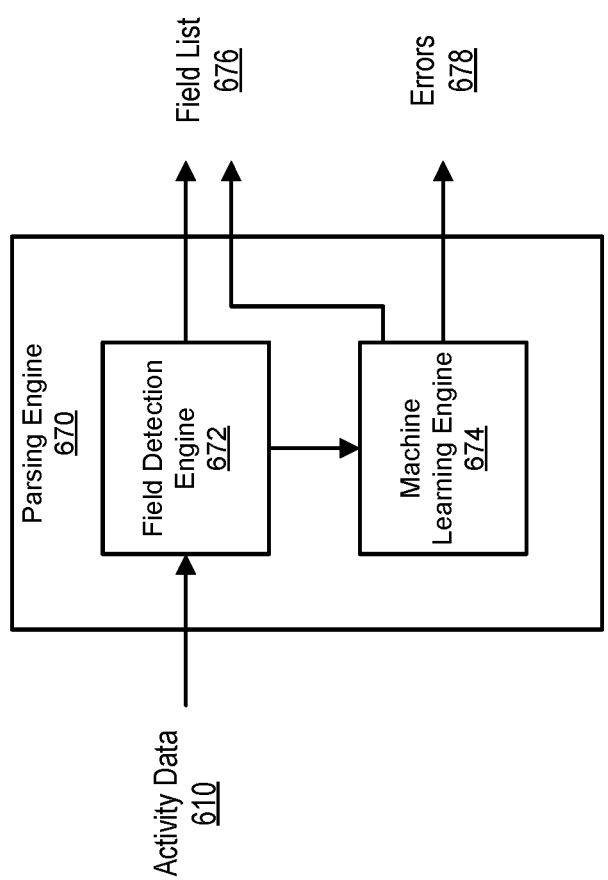
FIG. 6 includes a block diagram that illustrates in greater detail a parsing engine for a simulation engine.

FIG. 6 includes a block diagram that illustrates in greater detail a parsing engine 670 for a simulation engine, such as the simulation engine illustrated in FIG. 5. The parsing engine 670 of FIG. 6 can be implemented, for example, using program instructions that can be executed by the processors of a server computer. In some examples, the parsing engine 670 can be a standalone component. In some examples, the parsing engine 670 can be an integral component of the parsing engine 670. In some examples, the parsing engine 670 can include additional components, not illustrated here, for formatting and outputting the detected data in a configuration file and/or a template file.

In various examples, the parsing engine 670 can include a field detection engine 672 and a machine learning engine 674. The field detection engine 672 can receive as input activity data 610, which is the actual activity data that can be obtained from a service provider. In various examples, the field detection engine 672 can recognize a format of the activity data 610, such as determining whether the activity data 610 includes comma-separated-values, JSON data structures, XML structures, or another format. In some examples, a format for the activity data 610 is input into the field detection engine 672 along with the activity data 610.

Having the format of the activity data 610 can then enable the field detection engine 672 to extract the fields of each action in the activity data 610, and attempt to identify each field. Each action in the activity data 610 can frequently include similar information, such as a user who performed the action, an IP address associated with the user, and a timestamp for when the user performed the action. Different service providers and/or services, however, may use different formats to provide the same type of information. For example, one service provider may use the format MM/DD/YYYY, representing a two digit month, two digit day of the month, and four digit year, as a date format, while another uses DD/MM/YYYY or YYYY/MM/DD. As another example, one service provider may use HH:MM, representing a two digit hour and two digit minute, along with "AM" or "PM" to represent a time, while another uses a 24-hour format. As another example, a service provider may use so-called epoch time, a numerical value representing the number of seconds that have elapsed since Jan. 1, 1970. Other fields can have widely accepted and common formats. Examples of such fields include IP addresses usernames.

Actions in the activity data 610 can also include fields that are not common, and/or that are associated with a specific service provider or service. Additionally, one service provider or service may provide fields in one order while a different service provide provides the same fields in a different order. In various examples, the field detection engine 672 can use various techniques to identify each field in an action, and determine a name or type or the field. The field detection engine 672 can apply these techniques to both common fields and uncommon fields. Any field that the field detection engine 672 does not recognize can be provided to the machine learning engine 674.

Techniques used by the field detection engine 672 to identify fields can include pattern matching and/or use of a machine learning model. Pattern matching can include, for example, use of a set of commonly used formats for certain types of data, such as timestamps. Pattern matching can, additionally or alternatively, include using regular expression matching to identify the contents of a field. In some examples, the field detection engine 672 tests the contents of a field against all available patterns. In some examples, the field detection engine 672 makes some initial assumptions about a field, for example from the characters present in the field and/or from the field's location in the string of fields for the action, and then selects a subset of pattern to try.

Pattern matching can be quick and effective for common types of fields. Patterns may need to be manually coded, however. A machine learning model, on the other hand, can learn field content that represents the same type of data. For example, a machine learning model can be trained to recognize text that represents different web browser names or operating system names. Given the wide variety of available web browsers and operating systems, in this example, the machine learning model can associate each different web browser name, for example, with a same field type. The machine learning model can be implemented, for example, using clustering, a decision tree, a Bayesian network, or a neural network, among other examples.

For fields recognized by the field detection engine 672, the field detection engine 672 can output a field list 676. In various examples, the field list 676 can include a list of the types of fields identified. In some examples, the field detection engine 672 can include the content of the field, as an example or for use to determine random values for the field. In various examples, the parsing engine 670 can output a field list for each different type of action found in the activity data 610.

Fields that the field detection engine 672 does not recognize may be input into the machine learning engine 674, which can attempt to learn the unrecognized fields. The machine learning engine 674 can be supervised and/or unsupervised. In a supervised implementation, the machine learning engine 674 can present a new, unknown field to an operator, possibly with a list of suggested identifications, and the operator can provide and identification for the field. The machine learning engine 674 can then add the field and the identification to the machine learning model. In an unsupervised implementation, the machine learning engine 674 can use an algorithm such as a clustering algorithm to determine an identification for an unknown field.

When the machine learning engine 674 is able to determine an identification for an unrecognized field, the machine learning engine 674 can add the field's identification (and possibly also the original content of the field) to the field list 676. In some examples, when the machine learning engine 674 is not able to recognize a field, the machine learning engine 674 may nevertheless add the field to the field list 676, possibly with a generic identification (e.g., "Field0" or "UnknownField0" or something similar). In some examples, unrecognized fields that appear to have similar content, or that appear in the same location in a set of actions, is given the same generic name.

In some examples, when the machine learning engine 674 is not able to recognize a field, errors 678 output by the machine learning engine 674 can include identification of the unrecognized field.

In various examples, a machine learning model can be specific to a service provider or a service, such that the model can learn the fields of the service provider or service. In some examples, the machine learning model can be used across service providers and services. In these examples, the machine learning model may be able to learn a more diverse range of fields, and/or can use information learned from one service provider or service to identify the fields of another service provider or service.

Figure 7:
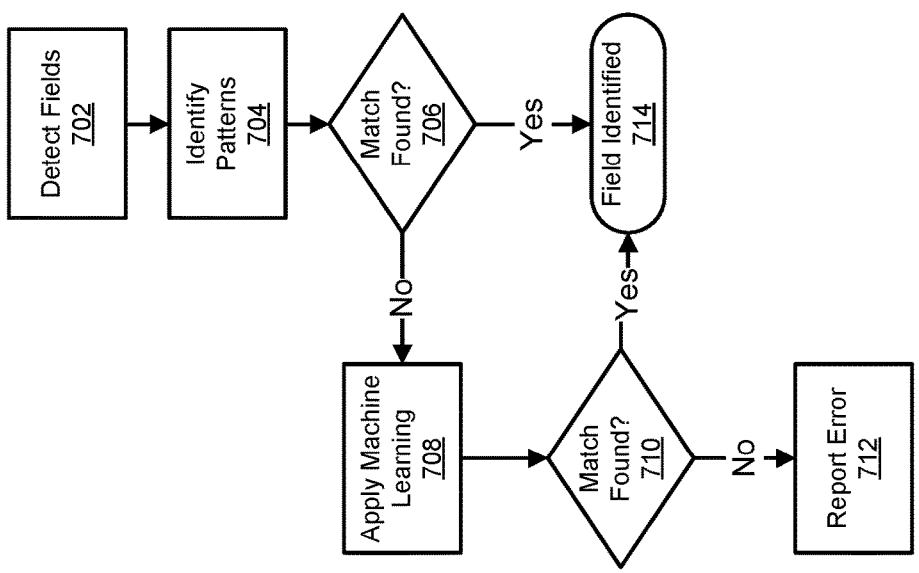
FIG. 7 includes a flowchart illustrating an example of the operation of the parsing engine.

FIG. 7 includes a flowchart 700 illustrating an example of the operation of the parsing engine of FIG. 6. At step 702, the parsing engine can detect fields in an entry from an activity log. Detecting fields can include, for example, separating a comma-separated-value string into the components that appear between the commas. As another example, detecting fields can include locating the fields in a JSON data structure, or a similar data structure.

At step 704, the parsing engine can identify patterns. Identifying patterns can include determining whether a field matches a previously defined pattern. Identifying patterns can also include using regular expressions to determine whether a field matches a particular pattern.

At step 706, the parsing engine can test whether a match was found at step 704. When a match is found, the parsing engine proceeds to step 714, having identified the field.

When the parsing engine determines, at step 706, that no match was found, then the parsing engine can proceed to step 708, and apply machine learning. Applying machine learning can include, for example, inputting a field into a neural network or a decision tree, or another type of machine learning model. The machine learning model may be able to classify the field based on previously learned field types.

At step 710, the parsing engine checks whether the machine learning model determined a classification. When the machine learning model can output a classification with a high degree of certainty (e.g., above a threshold level), then the parsing engine can proceed to step 714, having identified the field. Otherwise the parsing engine can proceed to step 712, and output an error. The error can bring the unidentified field to the attention of an operator, who can determine whether the field is entirely knew and thus needs to be taught to the machine learning model.

FIGS. 8A-8B include a flowchart that illustrates an example of a process 800 for testing a security monitoring and control system using a simulation engine. In various examples, the example process 800 can be performed by a computing system of a security management system. In various examples, the process 800 can be embodied as instructions that are stored on a non-transitory computer readable-medium, which can be executed by the processor or processors of a computing system to perform the steps of the process 800.

In FIG. 8A, at step 802, the process 800 includes obtaining activity data from a service provider system, wherein the activity data includes a list of actions performed during use of a cloud service, wherein actions in the list of actions are performed by one or more users associated with a tenant, wherein the service provider system provides the tenant with a tenant account, and wherein the tenant account enables the one or more users to use the cloud service. Actions can include, for example, logging into the cloud service in order to use the service, uploading or downloading files when the cloud service includes data hosting, performing searches when the cloud service includes a database, or sharing of files when the cloud service includes file sharing, among other examples.

In various examples, an action can be described by a list of fields. At step 804, the process 800 includes parsing an action from the list of actions to determine the list of fields included in the action. The fields can include, for example, a user identifier for a user who performed the action, a timestamp for when the action was performed, a description of the action performed, a resources affected by the action, and/or other information about the action.

At step 806, the process 800 includes identifying a field from the list a fields, wherein an identity of the field describes data included in the field. In some examples, the field may include data that often appears in an action, such as a user identifier or a timestamp. In some examples, the field may be specific to the action, the cloud service, and/or the service provider. In some examples, the contents of a field may be in a common and well-understood format. For example, user identifiers and IP addresses, may have few variations in the manner in which the data is presented. In some examples, there may be many ways to express the same information. For example, there may be many different ways to express a timestamp.

In some examples, identifying the field includes matching contents of the field against a pattern from a plurality of patterns. Patterns can be defined for fields that often appear in actions, such as user names, and fields that have few variations in the format, such as IP addresses. In various examples, patterns can also defined for less common fields and/or fields that are specific to a cloud service or service provider.

In some examples, identifying the field includes inputting contents of the field into a machine learning model, wherein the machine learning model associates fields having different formats with a same identity. The machine learning model can be trained, for example, using actual activity data from one or multiple service providers. The training can be supervised or unsupervised. The machine learning model may be able to learn various different ways in which data of the same type may be included in activity data. The machine learning model may also be able to learn service-specific and/or service provider-specific fields. The machine learning model can be implemented, for example, using a decision tree, a clustering system, or a neural network, among other examples.

At step 808, the process 800 includes generating a template for the action, the template include a data structure storing the identity of the field, wherein the template further includes a data structure describing a format of the action. In various examples, the data structure can include each field that was identified at step 806, optionally with the contents of the field to provide a possible value of the field. In various examples, the template can also record an order in which the fields appeared in the activity data, and/or an overall structure of the activity data (e.g., the activity data was structured as comma-separated-values, JSON data structures, XML data structures, or another structure).

In various examples, the template can be outputted to a file. The output can be formatted in a structured format, such as JSON, which can be efficiently read by other software applications.

At step 810, the process 800 includes generating a configuration associated with a test scenario, the configuration including a reference to the template and description of an action associated with the test scenario. In various examples, the action indicated in the configuration can be an action described by the template. In various examples, the test scenario can call for the action to appear to have been performed with certain values for the action's fields. Alternatively or additionally, the test scenario can call for the action to appear to have occurred a certain number of times. Alternatively or additionally, the test scenario can all for the action to appear to have occurred in conjunction with other actions, which can also be simulated. Other test scenarios involving one or multiple actions can be defined.

At step 812, the process 800 includes generating a simulated action for the action described in the configuration, wherein generating the simulated action includes using the template to determine fields for the action and an output structure for the action, and wherein generating the simulated action includes using a test description to select values for the fields. In some examples, the test description can provide the values to use for the fields. In some examples, the test description can provide a set or range of values from which a value can be randomly selected. In various examples, multiple or different test descriptions can be used to generated the simulated action with different values for the fields.

In FIG. 0.8B, at step 814, the process 800 includes generating simulated activity data that includes the simulated action, wherein the simulated activity data has a same format as the activity data. The activity data can be output to a log file, for example. In some examples, the process 800 can further include generating additional simulated actions. In these examples, each additional simulated action can have fields determined using the template and different randomized values for the fields. In some examples, the process 800 can include generating additional simulated actions that are different form the simulated action generated at step 812. These different simulated actions may also be specified by the configuration, and/or can be selected randomly. In these various examples, the additional simulated actions can also be included in the activity data.

At step 816, the process 800 includes inputting the simulated activity data into the security management system, wherein the security management system operates on the simulated activity data to determine whether actions included in the simulated activity data include use of the cloud service that constitutes a security risk, and wherein the simulated action causes security management system to perform a particular operation, wherein the particular operation is associated with the test scenario. In some examples, the test scenario is a violation of a security policy. In these examples, the simulated action can be generated to cause the security violation. When operating correctly, the security management system can determine that the simulated action violates the security policy. In some examples, the test scenario is anomaly detection. In these examples, the simulated action can be generated to case an anomaly, and when operating correctly the security management system determines that the simulated action is anomalous. In some examples, the activity data can be input into the security management system concurrently with the simulated activity data.

In various examples, the template generated at step 808 is associated with the particular cloud service. In these examples, the process 800 can further include generating a different template for a different cloud service, and generating different activity data using the different template and the same configuration.

In various examples, the process 800 can further include generating a second configuration associated with a second test scenario. The second configuration can, for example reference the same template file and describe a different action. In these examples, the process 800 further include generating different activity data using the second configuration and the template.

Figure 9:
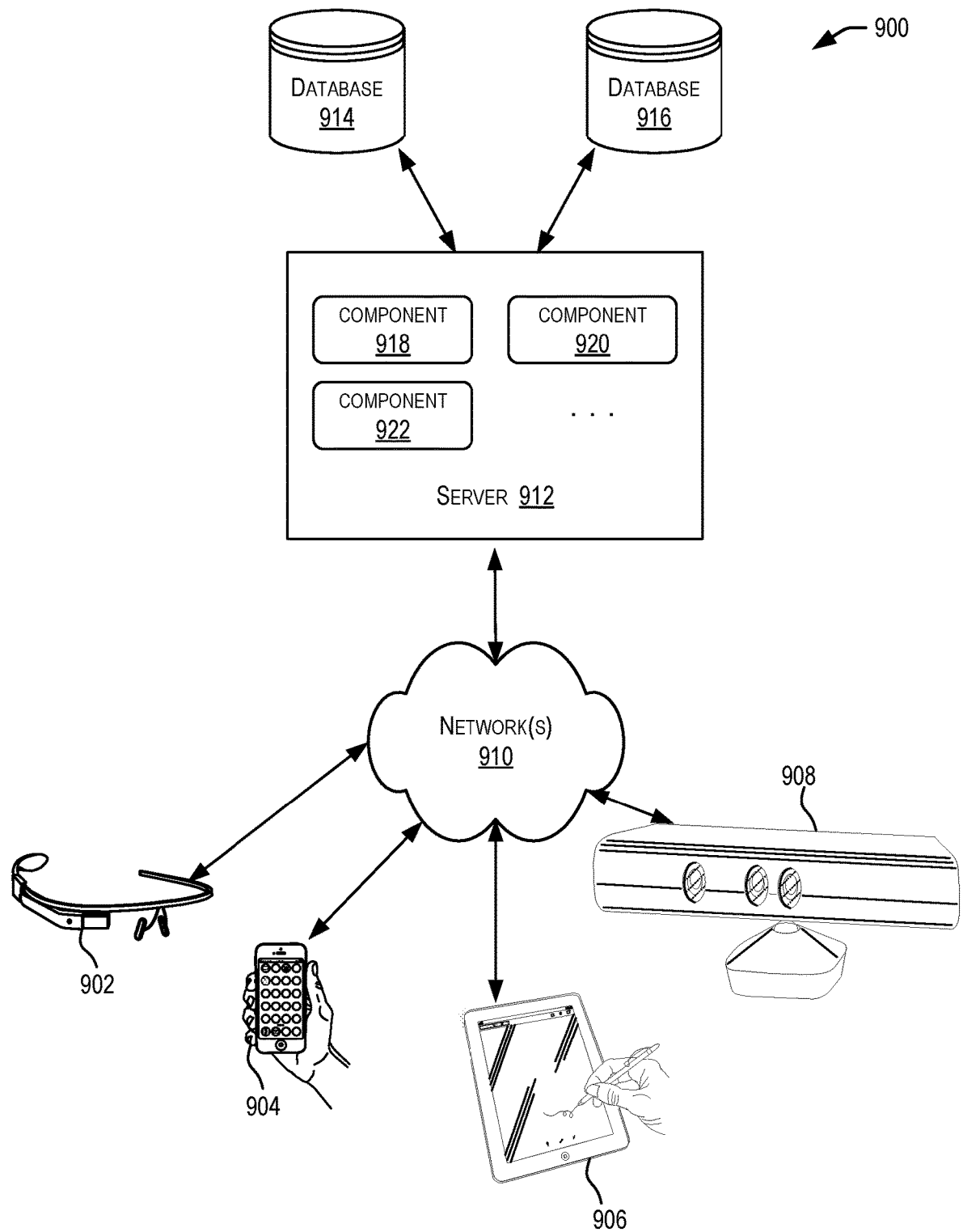
FIG. 9 depicts a simplified diagram of a distributed system in which the various examples discussed above can be implemented.

FIG. 9 depicts a simplified diagram of a distributed system 900 in which the various examples discussed above can be implemented. In the illustrated example, the distributed system 900 includes one or more client computing devices 902, 904, 906, 908, coupled to a server 912 via one or more communication networks 910. The client computing devices 902, 904, 906, 908 may be configured to run one or more applications.

In various embodiments, server 912 may be adapted to run one or more services or software applications that include a simulation engine for testing a security monitoring and control system. Users may use the client computing devices 902, 904, 906, 908 to use various cloud services. The providers of the cloud services can generate logs of this usage, and these logs can be used by the simulation engine to generate activity data that simulates users' use of the cloud services. The simulated activity data can be input into the security monitoring and control system to test whether the system is functioning as desired.

In various examples, the server 912 may also provide other services or software application, and can include non-virtual and virtual environments. In some examples, these services may be offered as web-based or cloud services or under a Software as a Service (SaaS) model to the users of the client computing devices 902, 904, 906, 908. Users operating the client computing devices 902, 904, 906, 908 may in turn use one or more client applications to interact with the server 912 to use the services provided by these components.

In the configuration depicted in FIG. 9, the server 912 may include one or more components 918, 920, 922 that implement the functions performed by the server 912. These components may include software components that may be executed by one or more processors, hardware components, or combinations thereof. It should be appreciated that various different system configurations are possible, which may be different from the example distributed system 900.

The client computing devices 902, 904, 906, 908 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 9 depicts only four client computing devices, any number of client computing devices may be supported.

Network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization, such as one or more flexible pools of logical storage devices that can be virtualized to maintain virtual storage devices for the server. In various examples, the server 912 may be adapted to run one or more services or software applications that perform the operations as described above.

The server 912 may run an operating system including any of those discussed above, as well as any commercially available server operating system. The server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, 908. As an example, data feeds and/or event updates may include, but are not limited to, Twitter® feeds, Facebook® updates or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, 908.

The distributed system 900 may also include one or more data repositories 914, 916. These data repositories may provide a mechanism for storing information various types of information, such as the information described by the various examples discussed above. The data repositories 914, 916 may reside in a variety of locations. For example, a data repository used by the server 912 may be local to server 912 or may be remote from server 912 and in communication with server 912 via a network-based or dedicated connection. The data repositories 914, 916 may be of different types. In some examples, a data repository used by the server 912 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 914, 916 may also be used by applications to store application data. The data repositories used by applications may be of different types such as, for example, a key-value store repository, an object store repository, or a general storage repository supported by a file system.

Figure 10:
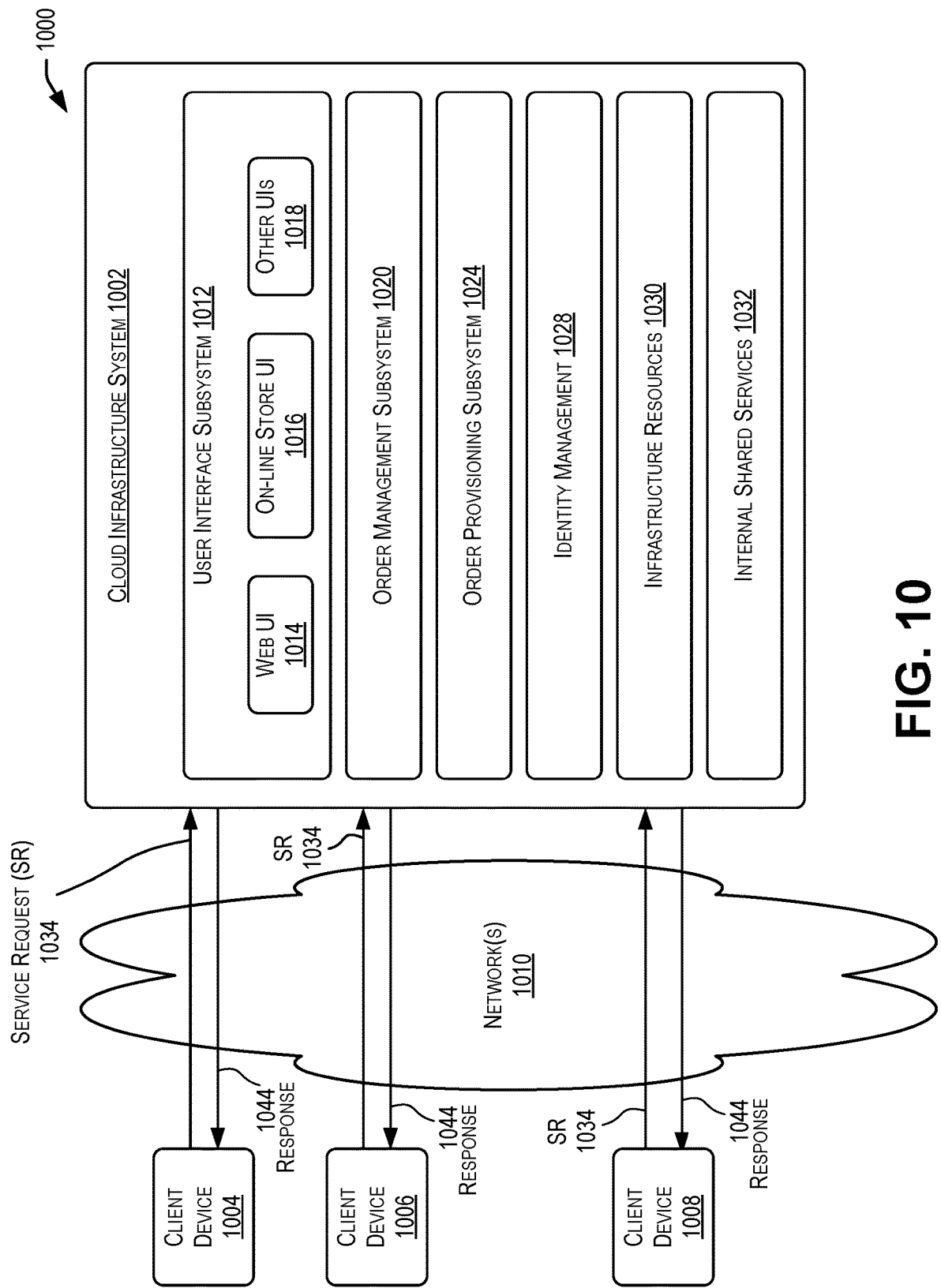
FIG. 10 is a simplified block diagram of one or more components of a system environment in which services may be offered as a cloud.

In some examples, a cloud environment may provide one or more services such as those discussed above. FIG. 10 is a simplified block diagram of one or more components of a system environment 1000 in which these and other services can be offered as cloud services. In the example illustrated in in FIG. 10, a cloud infrastructure system 1002 may provide one or more cloud services that may be requested by users using one or more client computing devices 1004, 1006, and 1008. The cloud infrastructure system 1002 may include one or more computers and/or servers that may include those described above for server 912 of FIG. 9. The computers in cloud infrastructure system 1002 of FIG. 10 may be organized as general purpose computers, specialized server computers, server farms, server clusters, or any other appropriate arrangement and/or combination.

Network(s) 1010 may facilitate communication and exchange of data between the clients 1004, 1006, 1008 and the cloud infrastructure system 1002. The network(s) 1010 may include one or more networks. The networks may be of the same or different types. The network(s) 1010 may support one or more communication protocols, including wired and/or wireless protocols, for facilitating the communications.

The example depicted in FIG. 10 is only one example of a cloud infrastructure system and is not intended to be limiting. It should be appreciated that, in other examples, the cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in other examples.

The term cloud service is generally used to refer to a service that is made available to users on demand and via a communication network such as the Internet by systems (e.g., the cloud infrastructure system 1002) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In various examples, the cloud infrastructure system 1002 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 1002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 1002 may be shared by multiple users and dynamically re-allocated per demand. Additionally, resources may be allocated to users in different time zones. For example, the cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 1002 may provide the cloud services via different deployment models. In a public cloud model, the cloud infrastructure system 1002 may be owned by a third party cloud services provider and the cloud services are offered to any general public customer, where the customer can be an individual or an enterprise. In certain other embodiments, under a private cloud model, the cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1002 and the services provided may be shared by several organizations in a related community. Various other models such as hybrids of the above mentioned models may also be used.

The client computing devices 1004, 1006, 1008 may be devices similar to those described above for the client computing devices 902, 904, 906, 908 of FIG. 9. The client computing devices 1004, 1006, 1008 of FIG. 10 may be configured to operate a client application such as a web browser, a proprietary client application (e.g., Oracle Forms), or some other application, which may be used by a user of the client computing device to interact with the cloud infrastructure system 1002 to use services provided by the cloud infrastructure system 1002.

In various examples, the cloud infrastructure system 1002 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 1002 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are used for facilitating the provision of various cloud services offered by cloud infrastructure system 1002. Infrastructure resources 1030 may include, for example, processing resources, storage or memory resources, networking resources, and the like.

In some examples, to facilitate efficient provisioning of these resources for supporting the various cloud services provided by cloud infrastructure system 1002 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 1002 may itself internally use the services 1032 that are shared by different components of cloud infrastructure system and which facilitate the provisioning of services by cloud infrastructure system. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 1002 may include multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. The user interface subsystem 1012 may include various different interfaces such as a web interface 1014, an online store interface 1016 where cloud services provided by cloud infrastructure system 1002 are advertised and are purchasable by a consumer, and other interfaces 1018. For example, a customer may, using a client device, request (service request 1034) one or more services provided by cloud infrastructure system 1002 using one or more of interfaces 1014, 1016, 1018. For example, a customer may access the online store, browse cloud services offered by cloud infrastructure system 1002, and place a subscription order for one or more services offered by cloud infrastructure system 1002 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 10, the cloud infrastructure system 1002 may include an order management subsystem (OMS) 1020 that is configured to process the new order. As part of this processing, OMS 1020 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

The cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services.

The cloud infrastructure system 1002 may provide services to multiple customers. For each customer, the cloud infrastructure system 1002 is responsible for managing information related to one or more subscription orders received from the customer, maintaining customer data related to the orders, and providing the requested services to the customer. The cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 1002 may provide services to multiple customers in parallel. The cloud infrastructure system 1002 may store information for these customers, including possibly proprietary information. In some examples, the cloud infrastructure system 1002 includes an identity management subsystem (IMS) 1028 that is configured to manage customers information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

FIG. 11 illustrates an example of a computer system 1100 that may be used to implement the various examples discussed above. In some examples, the computer system 1100 may be used to implement any of the various servers and computer systems described above. As shown in FIG. 11, the computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118 and a communications subsystem 1124. The storage subsystem 1118 may include non-transitory computer-readable storage media 1122 and a system memory 1110.

The bus subsystem 1102 provides a mechanism for letting the various components and subsystems of the computer system 1100 communicate with each other as intended. Although the bus subsystem 1102 is shown schematically as a single bus, alternate examples of the bus subsystem may utilize multiple buses. The bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 1104 controls the operation of the computer system 1100 and may comprise one or more processors, application specific integrated circuits (ASICs), or field programmable gate arrays (FPGAs). The processors may include be single core or multi-core processors. The processing resources of computer system 1100 can be organized into one or more processing units 1132, 1134. A processing unit may include one or more processors, including single core or multi-core processors, one or more cores from the same or different processors, a combination of cores and processors, or other combinations of cores and processors. In some examples, the processing subsystem 1104 can include one or more special purpose co-processors such as graphics processors, digital signal processors (DSPs), or the like. In some examples, some or all of the processing units of the processing subsystem 1104 can be implemented using customized circuits, such as application specific integrated circuits (ASICs), or field programmable gate arrays (FPGAs).

In some examples, the processing units in the processing subsystem 1104 can execute instructions stored in the system memory 1110 or on the computer readable storage media 1122. In various examples, the processing units can execute a variety of programs or code instructions and can maintain multiple concurrently executing programs or processes. At any given time, some or all of the program code to be executed can be resident in the system memory 1110 and/or on the computer-readable storage media 1122 including potentially on one or more storage devices. Through suitable programming, the processing subsystem 1104 can provide various functionalities described above. In instances where computer system 1100 is executing one or more virtual machines, one or more processing units may be allocated to each virtual machine In some examples, a processing acceleration unit 1106 may be provided for performing customized processing or for off-loading some of the processing performed by the processing subsystem 1104 so as to accelerate the overall processing performed by the computer system 1100.

The I/O subsystem 1108 may include devices and mechanisms for inputting information to the computer system 1100 and/or for outputting information from or via the computer system 1100. In general, use of the term "input device" is intended to include all possible types of devices and mechanisms for inputting information to the computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 1118 provides a repository or data store for storing information that is used by the computer system 1100. The storage subsystem 1118 provides a tangible non-transitory computer-readable storage medium for storing the basic programming and data constructs that provide the functionality of some examples. Software (e.g., programs, code modules, instructions) that when executed by the processing subsystem 1104 provide the functionality described above may be stored in the storage subsystem 1118. The software may be executed by one or more processing units of the processing subsystem 1104. The storage subsystem 1118 may also provide a repository for storing data used in accordance with the present disclosure.

The storage subsystem 1118 may include one or more non-transitory memory devices, including volatile and non-volatile memory devices. As shown in FIG. 11, the storage subsystem 1118 includes a system memory 1110 and a computer-readable storage media 1122. The system memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 1100, such as during start-up, may typically be stored in the ROM. The RAM typically contains data and/or program modules that are presently being operated and executed by the processing subsystem 1104. In some implementations, the system memory 1110 may include multiple different types of memory, such as static random access memory (SRAM) or dynamic random access memory (DRAM), and the like.

By way of example, and not limitation, as depicted in FIG. 11, the system memory 1110 may load application programs 1112 that are being executed, which may include client applications, Web browsers, mid-tier applications, relational database management systems (RDBMS), etc., program data 1111, and an operating system 1116. By way of example, the operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 1122 may store programming and data constructs that provide the functionality of some examples. The computer-readable media 1122 may provide storage of computer-readable instructions, data structures, program modules, and other data for the computer system 1100. Software (programs, code modules, instructions) that when executed by the processing subsystem 1104 provides the functionality described above that may be stored in the storage subsystem 1118. By way of example, the computer-readable storage media 1122 may include non-volatile memory such as a hard disk drive, a magnetic disk drive, an optical disk drive such as a CD ROM, DVD, a Blu-Ray® disk, or other optical media. The computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 1122 may provide storage of computer-readable instructions, data structures, program modules, and other data for the computer system 1100.

In some examples, the storage subsystem 1118 may also include a computer-readable storage media reader 1120 that can further be connected to the computer-readable storage media 1122. The reader 1120 may receive and be configured to read data from a memory device such as a disk, a flash driver, etc.

In some examples, the computer system 1100 may support virtualization technologies, including but not limited to virtualization of processing and memory resources. For example, the computer system 1100 may provide support for executing one or more virtual machines. The computer system 1100 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 1100. Accordingly, multiple operating systems may potentially be run concurrently by the computer system 1100.

The communications subsystem 1124 provides an interface to other computer systems and networks. The communications subsystem 1124 serves as an interface for receiving data from and transmitting data to other systems from the computer system 1100. For example, the communications subsystem 1124 may enable the computer system 1100 to establish a communication channel to one or more client computing devices via the Internet for receiving and sending information from and to the client computing devices.

The communication subsystem 1124 may support both wired and/or wireless communication protocols. For example, in some examples, the communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 1124 can provide wired network connectivity (e.g., Ethernet) in addition to or instead of a wireless interface.

The communication subsystem 1124 can receive and transmit data in various forms. For example, in some examples, the communications subsystem 1124 may receive input communication in the form of structured and/or unstructured data feeds 1126, event streams 1128, event updates 1130, and the like. For example, the communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

The communications subsystem 1124 may also be configured to output the structured and/or unstructured data feeds 1126, event streams 1128, event updates 1130, and the like to one or more databases that may be in communication with one or more streaming data source computers coupled to the computer system 1100.

The computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various examples.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific implementations have been described, these are not intended to be limiting. Various modifications and equivalents are within the scope of the following claims.

What is claimed is:

1. A computer-implemented method comprising, at a computer system of a security management system:
    obtaining activity data from a service provider system, wherein the activity data includes a list of actions performed during use of a cloud service, wherein actions in the list of actions are performed by one or more users associated with a tenant, wherein the service provider system provides the tenant with a tenant account, and wherein the tenant account enables the one or more users to use the cloud service;
    generating a simulated action from the list of actions to determine fields for the simulated action;
    generating simulated activity data that includes the simulated action;
    inputting the simulated activity data and the activity data from the service provider system concurrently into the security management system; and
    executing operations by the security management system on the simulated activity data and the activity data from the service provider system concurrently to determine whether actions included in the simulated activity data indicate use of the cloud service that constitutes a security risk.

2. The method of claim 1, further comprising:
    parsing an action from the list of actions to determine a list of fields included in the action.

3. The method of claim 2, further comprising:
identifying a field in the list of fields, wherein an identity of the field describes data included in the field.

4. The method of claim 3, wherein identifying the field includes matching contents of the field against a pattern from a plurality of patterns.

5. The method of claim 1, wherein generating the simulated action further comprises using a test description to select values for fields in the simulated action.

6. The method of claim 1, wherein the simulated action causes the security management system to perform a particular operation, wherein the particular operation is associated with a test scenario.

7. A computing system of a security management system, comprising:
one or more processors; and
one or more memories comprising instructions that, when executed by the one or more processors, cause the one or more processors to perform operations comprising:
obtaining activity data from a service provider system, wherein the activity data includes a list of actions performed during use of a cloud service, wherein actions in the list of actions are performed by one or more users associated with a tenant, wherein the service provider system provides the tenant with a tenant account, and wherein the tenant account enables the one or more users to use the cloud service;
generating a simulated action from the list of actions to determine fields for the simulated action;
generating simulated activity data that includes the simulated action;
inputting the simulated activity data and the activity data from the service provider system concurrently into the security management system; and
executing operations by the security management system operates on the simulated activity data and the activity data from the service provider system concurrently to determine whether actions included in the simulated activity data indicate use of the cloud service that constitutes a security risk.

8. The computing system of claim 7, wherein the operations further comprise:
parsing an action from the list of actions to determine a list of fields included in the action; and
identifying a field in the list of fields by inputting contents of the field into a machine learning model, wherein the machine learning model associates fields having different formats with a same identity.

9. The computing system of claim 7, wherein the operations further comprise:
generating a template for an action in the list of actions, wherein the template comprises a data structure describing a format of the action;
generating a configuration associated with a test scenario, the configuration including a reference to the template; and
generating the simulated action using the template.

10. The computing system of claim 9, wherein the operations further comprise:
generating additional simulated actions, each additional simulated action having fields determined using the template and different randomized values for the fields, wherein the simulated activity data includes the additional simulated actions.

11. The computing system of claim 9, wherein the template is associated with the cloud service, wherein the operations further comprise:

generating a different template for a different cloud service; and
generating different activity data using the different template and the configuration.

12. The computing system of claim 9, wherein the operations further comprise:
generating a second configuration associated with a second test scenario; and
generating different activity data using the second configuration and the template.

13. The computing system of claim 9, wherein
the test scenario is designed to detect anomalies, and the security management system determines that the simulated action is anomalous.

14. The computing system of claim 9, wherein the test scenario is a violation of a security policy, and wherein the security management system determines that the simulated action violates the security policy.

15. A non-transitory computer-readable medium comprising instructions that, when executed by one or more processors of a computing system of a security management system, cause the one or more processors to perform operations comprising:
obtaining activity data from a service provider system, wherein the activity data includes a list of actions performed during use of a cloud service, wherein actions in the list of actions are performed by one or more users associated with a tenant, wherein the service provider system provides the tenant with a tenant account, and wherein the tenant account enables the one or more users to use the cloud service;
generating a simulated action from the list of actions to determine fields for the simulated action;
generating simulated activity data that includes the simulated action;
inputting the simulated activity data and the activity data from the service provider system concurrently into the security management system; and
executing operations by the security management system on the simulated activity data and the activity data from the service provider system concurrently to determine whether actions included in the simulated activity data indicate use of the cloud service that constitutes a security risk.

16. The non-transitory computer-readable medium of claim 15, wherein the operations further comprise:
parsing an action from the list of actions to determine a list of fields included in the action; and
identifying a field in the list of fields by inputting contents of the field into a machine learning model, wherein the machine learning model associates fields having different formats with a same identity.

17. The non-transitory computer-readable medium of claim 15, wherein the operations further comprise:
generating additional simulated actions, each additional simulated action having fields determined using a template and different randomized values for the fields, wherein the simulated activity data includes the additional simulated actions.

18. The non-transitory computer-readable medium of claim 15, wherein the operations further comprise:
generating a template for an action in the list of actions, wherein the template comprises a data structure describing a format of an action from the list of actions;
generating a configuration associated with a test scenario, the configuration including a reference to the template; and generating the simulated action using the template to determine a list of fields for the simulated action.

19. The non-transitory computer-readable medium of claim 18, wherein the template is associated with the cloud service, wherein the operations further comprise:

generating a different template for a different cloud service; and generating different activity data using the different template and the configuration.

\* \* \* \* \*

UNITED STATES PATENT AND TRADEMARK OFFICE
CERTIFICATE OF CORRECTION

PATENT NO. : 11,734,148 B2
APPLICATION NO. : 17/723336
DATED : August 22, 2023
INVENTOR(S) : Biswas et al.

It is certified that error appears in the above-identified patent and that said Letters Patent is hereby corrected as shown below:

In the Drawings

On sheet 8 of 12, in FIG. 8A, under Reference Numeral 806, Line 1, delete "a" and insert -- of --, therefor.

In the Specification

In Column 2, Line 46, delete "a" and insert -- of --, therefor.

In Column 6, Line 5, delete "an" and insert -- can --, therefor.

In Column 9, Line 15, delete "106a-106c." and insert -- 106a-106c, --, therefor.

In Column 9, Line 37, delete "The" and insert -- the --, therefor.

In Column 9, Line 41, delete "the a" and insert -- the --, therefor.

In Column 11, Line 50, after "group" insert -- of --, therefor.

In Column 16, Line 41, delete "&1" and insert -- 8d --, therefor.

In Column 20, Line 31, delete "n that" and insert -- in that --, therefor.

In Column 23, Line 19, delete "SalesForce" and insert -- Salesforce --, therefor.

In Column 23, Line 59, delete "028" and insert -- 208 --, therefor.

In Column 24, Line 24, delete "services" and insert -- services. --, therefor.

In Column 30, Line 11, delete "314" and insert -- 314). --, therefor.

Signed and Sealed this
Ninth Day of July, 2024

Katherine Kelly Vidal
*Director of the United States Patent and Trademark Office*

In Column 32, Line 20, delete "("avglogipcntday42k"),"  and insert -- ("avglogipcntday4wk"), --, therefor.

In Column 34, Line 53, delete "Combine" and insert -- Combined --, therefor.

In Column 35, Line 27, delete "Combine" and insert -- Combined --, therefor.

In Column 35, Line 38, delete "L Combined>T" and insert -- L_Combined>T --, therefor.

In Column 36, Line 40, delete "Combine" and insert -- Combined --, therefor.

In Column 36, Line 50, delete "L Combined>T" and insert -- L_Combined>T --, therefor.

In Column 37, Line 15, delete "Combine" and insert -- Combined --, therefor.

In Column 37, Lines 21-22, delete "L Combined>T" and insert -- L_Combined>T --, therefor.

In Column 37, Line 36, delete "ounts" and insert -- counts --, therefor.

In Column 37, Line 39, delete "ounts" and insert -- counts --, therefor.

In Column 37, Line 43, delete "ounts" and insert -- counts --, therefor.

In Column 37, Line 51, delete "Combine" and insert -- Combined --, therefor.

In Column 37, Lines 57-58, delete "L Combined>T" and insert -- L_Combined>T --, therefor.

In Column 38, Line 33, delete "delete "$I_2W_s$" and insert -- $I_2W_2$ --, therefor.

In Column 38, Line 42, delete "adminsitrators" and insert -- administrators --, therefor.

In Column 38, Line 45, delete "autoamated" and insert -- automated --, therefor.

In Column 38, Line 57, delete "++" and insert -- +...+ --, therefor.

In Column 38, Line 57, delete "$c_l$" and insert -- $c_i$ --, therefor.

In Column 41, Line 62, delete "can to" and insert -- to --, therefor.

In Column 46, Line 67, delete "l1" and insert -- 11 --, therefor.

In Column 47, Line 24, delete "outputformat" and insert -- output format --, therefor.

In Column 50, Line 6, delete ""event-time"" and insert -- "event_time" --, therefor.

CERTIFICATE OF CORRECTION (continued)
U.S. Pat. No. 11,734,148 B2

In Column 50, Line 40, delete ""event action"" and insert -- "event_action" --, therefor.

In Column 50, Line 57, delete "outputformat" and insert -- output format --, therefor.

In Column 51, Line 18, delete "outputformat" and insert -- output format --, therefor.

In Column 51, Line 35, delete "outputformat" and insert -- output_format --, therefor.

In Column 51, Line 38, delete "outputformat" and insert -- output_format --, therefor.

In Column 51, Line 41, delete "outputformat" and insert -- output_format --, therefor.

In Column 51, Line 44, delete "outputformat" and insert -- output_format --, therefor.

In Column 51, Line 47, delete "outputformat" and insert -- output_format --, therefor.

In Column 51, Line 50, delete "outputformat" and insert -- output_format --, therefor.

In Column 51, Line 53, delete "outputformat" and insert -- output_format --, therefor.

In Column 55, Line 16, delete "a" and insert -- of --, therefor.

In Column 55, Line 33, after "also" insert -- be --, therefor.

In Column 56, Line 26, delete "0.8B," and insert -- 8B, --, therefor.

In Column 59, Line 22, delete "in in" and insert -- in --, therefor.

In Column 64, Line 18, delete "machine" and insert -- machine. --, therefor.

In the Claims

In Column 69, Line 36, in Claim 7, before "on" delete "operates".